US009384187B2

(12) United States Patent
Verma et al.

(10) Patent No.: US 9,384,187 B2
(45) Date of Patent: Jul. 5, 2016

(54) DOCUMENT ANALYSIS, COMMENTING, AND REPORTING SYSTEM

(75) Inventors: Kunal Verma, Sunnyvale, CA (US); Alex Kass, Palo Alto, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 783 days.

(21) Appl. No.: 13/567,557

(22) Filed: Aug. 6, 2012

(65) Prior Publication Data

US 2012/0296940 A1 Nov. 22, 2012

Related U.S. Application Data

(63) Continuation of application No. 12/121,503, filed on May 15, 2008, now Pat. No. 8,266,519, which is a continuation-in-part of application No. 11/945,958, filed on Nov. 27, 2007, now Pat. No. 8,412,516.

(51) Int. Cl.
| G06F 17/00 | (2006.01) |
| G06F 17/27 | (2006.01) |
| G06F 17/22 | (2006.01) |
| G06F 9/44 | (2006.01) |
| G06F 17/30 | (2006.01) |

(52) U.S. Cl.
CPC ............... *G06F 17/277* (2013.01); *G06F 8/10* (2013.01); *G06F 17/2247* (2013.01); *G06F 17/274* (2013.01); *G06F 17/2775* (2013.01); *G06F 17/30011* (2013.01); *G06F 17/30731* (2013.01)

(58) Field of Classification Search
CPC ............................ G06F 17/2247; G06F 17/227
USPC ............................................ 715/200, 229, 234
See application file for complete search history.

(56) References Cited

U.S. PATENT DOCUMENTS

| 5,369,575 | A | 11/1994 | Lamberti et al. |
| 5,774,833 | A | 6/1998 | Newman |
| 5,995,920 | A | 11/1999 | Carbonell et al. |
| 6,139,201 | A | 10/2000 | Carbonell et al. |
| 6,167,370 | A | 12/2000 | Tsourikov et al. |
| 6,343,297 | B1 | 1/2002 | D'Anjou et al. |
| 6,510,425 | B1 | 1/2003 | Okamoto et al. |
| 6,681,383 | B1 | 1/2004 | Pastor et al. |
| 6,715,130 | B1 | 3/2004 | Eiche et al. |
| 6,886,115 | B2 | 4/2005 | Kondoh et al. |
| 7,111,076 | B2 | 9/2006 | Abjanic et al. |

(Continued)

FOREIGN PATENT DOCUMENTS

EP        1 672 547 A1    6/2006

OTHER PUBLICATIONS

Communication pursuant to Article 94(3) EPC issued in EP 08 020 182.5 on Dec. 5, 2012 (5 pgs).

(Continued)

*Primary Examiner* — Gregory J. Vaughn
(74) *Attorney, Agent, or Firm* — Brinks Gilson & Lione

(57) ABSTRACT

A method includes identifying a document structure instance that includes structure components. A selected structure component is chosen from the structure components. The method includes generating, with a processor, a hierarchical graph based on the selected structure component. The hierarchical graph includes classes, a class definition relationship, and an instance identifier that identifies the selected structure component. The hierarchical graph is output.

19 Claims, 24 Drawing Sheets

(56) References Cited

U.S. PATENT DOCUMENTS

| | | | |
|---|---|---|---|
| 7,143,091 B2* | 11/2006 | Charnock et al. | |
| 7,146,422 B1 | 12/2006 | Marlatt et al. | |
| 7,337,102 B2* | 2/2008 | Mosterman | 703/21 |
| 7,500,185 B2 | 3/2009 | Hu | |
| 7,536,711 B2* | 5/2009 | Miyashita et al. | 726/3 |
| 7,593,891 B2 | 9/2009 | Kornegay et al. | |
| 7,647,349 B2 | 1/2010 | Hubert et al. | |
| 7,694,222 B2 | 4/2010 | Steen et al. | |
| 7,725,923 B2* | 5/2010 | Miyashita et al. | 726/1 |
| 7,752,094 B2 | 7/2010 | Davidson et al. | |
| 7,769,570 B2* | 8/2010 | Mosterman | 703/2 |
| 7,774,743 B1* | 8/2010 | Sanchez et al. | 717/103 |
| 7,877,737 B2* | 1/2011 | Austin et al. | 717/132 |
| 7,975,220 B2 | 7/2011 | Hattori | |
| 2002/0065857 A1 | 5/2002 | Michalewicz et al. | |
| 2002/0147763 A1* | 10/2002 | Lee et al. | 709/202 |
| 2002/0165717 A1* | 11/2002 | Solmer et al. | 704/256 |
| 2002/0184397 A1* | 12/2002 | Cooper | 709/310 |
| 2003/0149692 A1 | 8/2003 | Mitchell | |
| 2003/0172135 A1* | 9/2003 | Bobick et al. | 709/220 |
| 2003/0182310 A1* | 9/2003 | Charnock et al. | 707/104.1 |
| 2003/0220853 A1 | 11/2003 | Back et al. | |
| 2004/0025110 A1* | 2/2004 | Hu | 715/500 |
| 2004/0030540 A1 | 2/2004 | Ovil et al. | |
| 2004/0034651 A1* | 2/2004 | Gupta et al. | 707/102 |
| 2004/0039734 A1* | 2/2004 | Judd et al. | 707/3 |
| 2004/0083092 A1 | 4/2004 | Valles | |
| 2004/0153992 A1 | 8/2004 | Molina-Moreno et al. | |
| 2004/0215443 A1 | 10/2004 | Hatton | |
| 2005/0108001 A1 | 5/2005 | Aarskog | |
| 2005/0216882 A1 | 9/2005 | Sundararajan et al. | |
| 2006/0041579 A1* | 2/2006 | Miyashita et al. | 707/102 |
| 2006/0085451 A1* | 4/2006 | Pal et al. | 707/100 |
| 2006/0085489 A1* | 4/2006 | Tomic et al. | 707/200 |
| 2006/0190804 A1 | 8/2006 | Yang | |
| 2006/0253418 A1* | 11/2006 | Charnock et al. | 707/1 |
| 2006/0265646 A1 | 11/2006 | Girolami | |
| 2006/0282266 A1 | 12/2006 | Lopez-Barquilla et al. | |
| 2007/0143329 A1 | 6/2007 | Vigen | |
| 2007/0244859 A1 | 10/2007 | Trippe et al. | |
| 2007/0294230 A1 | 12/2007 | Sinel et al. | |
| 2008/0033897 A1* | 2/2008 | Lloyd | 706/19 |
| 2009/0138793 A1 | 5/2009 | Verma et al. | |

OTHER PUBLICATIONS

David Hay et al., "Defining Business Rules—What are they really?", Retrieved from the Internet: URL:http://www.busniessrulesgroup.org/first_paper/BRG-whatisBR_3ed.pdf, XP055045464 published in Jul. 2000 (78 pgs).

"Apache OpenNLP," The Apache Software Foundation, 2010, printed from the internet at <http://incubator.apache.org.opennlp/index.html> on Aug. 22, 2011, 2 pages.

"IEEE Standard for Software and System Test Documentation," IEEE Standard 829-2008, IEEE Computer Society, 2008, 132 pages.

"Information Technology—Open Distributed Processing—Reference model: Architecture," International Standard, ISO/IEC 10746-3, 1st Ed. 1996, 68 pages.

"Information technology—Open Distributed Processing—Reference model: Foundations" ISO/IEC 10746-2, 1st Ed., 1996, 28 pages.

"Modeling," Software Development Times, Jun. 1, 2007, 2 pages.

"The Phrase Parser," printed from the internet at <http://www.abisource.com/projects/link-grammar/dict/ph-explanation.html> on Feb. 21, 2012, 8 pages.

"The Stanford Parser: A statistical parser," The Stanford Natural Language Processing Group, printed from the internet at <http://nlp.stanford.edu/software/lex-parser.shtml> on Feb. 21, 2012, 6 pages.

"WebSphere Industry Content Packs accelerate Insurance, Banking, Telecom, Healthcare & Industrial PLM WebSphere BPM solutions," IBM Software, printed from the internet at <http://www-142.ibm.com/software/products/gb/en/inducontpack/> on Feb. 21, 2012, 5 pages.

Alani, H. et al., "Automatic Ontology-Based Knowledge Extraction from Web Documents," IEEE Intelligent Systems, 2003, pp. 14-21.

Anandha Mala, G.S. et al., "Automatic Construction of Object-Oriented Design Models [UML Diagrams] from Natural Language Requirements Specification," PRICAI, 2006, pp. 1155-1159.

Anderson, T. et al., "On Formal Support for Industrial-Scale Requirements Analysis," Department of Computing Science, University of Newcastle upon Tyne, UK, 1993, pp. 426-451.

ANTLR, URL: printed from the internet at <http://www.antlr.org>, on May 18, 2010, 2 pages.

Appfuse, 2008, printed from the internet at <http://appfuse.org/display/APF/Home> on Aug. 16, 2011, 2 pages.

Baader, F. et al., "Description Logics," Reasoning Web. Semantic Technologies for Information Systems, 2009, 40 pages.

Baader, F. et al., Chapter 3, Description Logics, Elsevier, 2007, 47 pages.

Baral, C. et al., "Using AnsProlog with Link Grammar and WordNet for QA with deep reasoning," 9th International Conference on Information Technology, IEEE Computer Society, 2006, 4 pages.

Basili, V. R. et al., "Comparing the Effectiveness of Software Testing Strategies," IEEE Transactions on Software Engineering, vol. SE-13, No. 12, 1987, pp. 1278-1296.

Basler, M. et al., "Introducing the Java Pet Store 2.0 Application," 2007, printed from the internet at <http://java.sun.com/jsp.utils/PrintPage.jsp?url=http%3A%2F%2Fjava.sun.com%2Fdevelo . . . > on Aug. 17, 2011, 10 pages.

Biswal, B. N. et al., "A Novel Approach for Scenario-Based Test Case Generation," International Conference on Technology, IEEE Computer Society, 2008, pp. 244-247.

Boddu, R. et al., "RETNA: From Requirements to Testing in a Natural Way," Proceedings of the 12th IEEE International Requirements Engineering Conference, 2004, 10 pages.

Boehm, B. et al., "Identifying Quality-Requirement Conflicts," IEEE Software, vol. 13, No. 2, IEEE Computer Society Press, Los Alamitos, 1996, pp. 25-35.

Boehm, B. W., "Understanding and Controlling Software Costs," IEEE Transactions on Software Engineering, vol. 14, No. 10, 1988, pp. 1462-1477.

Borland Software Corporation, "Mitigating Risk with Effective Requirements Engineering," Apr. 2005, 14 pages.

Brandozzi, M. et al., "Transforming Goal Oriented Requirement Specifications into Architecture Prescriptions," Proceedings STRAW '01, ICSE 2001, 8 pages.

Ravenflow website, 2005-2006, http://www.ravenflow.com, last accessed on Jan. 30, 2008, 71 pages.

Crain, A., "The Simple Artifacts of Analysis and Design," IBM Software Group, 2004, printed from the internet at <http://www.ibm.com/developerworks/rational/library/4871.html> on Aug. 18, 2011, 7 pages.

Cunning, S. J. et al., "Test Scenario Generation from a Structured Requirements Specification," IEEE Conference and Workshop on Engineering of Computer-Based Systems, ecbs, 1999, 7 pages.

Curtis, Dr. B., Best Practices for Requirements Development and Management, Borland Software Corporation, 2005, 36 pages.

Dahab, M. Y. et al., "TextOntoEx: Automatic ontology construction from natural English text," Expert Systems with Applications, vol. 34, 2008, pp. 1474-1480.

Daneva, M., "ERP Requirements Engineering Practice: Lessons Learned," IEEE Software, 2004. pp. 26-33.

Daneva, M., "Establishing Reuse Measurement Practices in SAP Requirements Engineering," IEEE, 2000, 10 pages.

Dashofy, E. M. et al., "A Comprehensive Approach for the Development of Modular Software Architecture Description Languages," ACM Transactions on Software Engineering and Methodology, vol. 14, No. 2, 2005, pp. 199-245.

de Marneffe, M-C. et al., "Generating Typed Dependency Parses from Phrase Structure Parses," LRCE, 2006, 6 pages.

de Marneffe, M-C. et al., "Stanford typed dependencies manual," Sep. 2008 (Revised for Stanford Parser v. 1.6.2, 2010), 20 pages.

Deeptimahanti, D. K. et al., "An Automated Tool for Generating UML Models from Natural Language Requirements," IEEE/ACM International Conference on Automated Software Engineering, IEEE Computer Society, 2009, pp. 680-682.

(56) References Cited

OTHER PUBLICATIONS

Deeptimahanti, D. K. et al., "Semi-automatic Generation of UML Models from Natural Language Requirements," India Software Engineering Conference, 2011, pp. 165-174.
Dickinson, I., "Jena Ontology API," 2009, printed from the internet at <http://jena.sourceforge.net/ontology/> on Feb. 21, 2012, 29 pages.
Duan, M., "Ravenflow Seeks to Eliminate Software Ambiguity, Errors," Silicon Valley / San Joes Business Journal, Nov. 17, 2006, 2 pages.
Egyed, A., "Scalable Consistency Checking between Diagrams—The ViewIntegra Approach," Proceedings of the 16th IEEE International Conference on Automated Software Engineering, USA: San Diego, 2001, 4 pages.
Fabbrini, F. et al., "The Linguistic Approach to the Natural Language Requirements Quality: Benefit of the use of an Automatic Tool," SEW '01 Proceedings of the 26th Annual NASA Goddard Software Engineering Workshop, 2001, 9 pages.
Fantechi, A. et al., "A Content Analysis Technique for Inconsistency Detection in Software Requirements Documents," WER, 2005, pp. 245-256.
Gervasi, V. et al., "Reasoning About Inconsistencies in Natural Language Requirements," ACM Transactions on Software Engineering and Methodology, vol. 14, No. 3, 2005, pp. 277-330.
Glass, R. L., *Facts and Fallacies of Software Engineering*, Addison Wesley, copyright 2003, 150 pages.
Gnesi, S. et al., "An Automatic Tool for the Analysis of Natural Language Requirements," Comput. Syst. Sci. Eng., 2005, 13 pages.
Grunbacher, P. et al., "Reconciling Software Requirements and Architectures: The CBSP Approach," Proceedings of the 5th IEEE International Symposium on Requirements Engineering, Toronto, Canada, 2001, 10 pages.
Hall, J. G. et al., "Relating Software Requirements and Architectures using Problem Frames," Proceedings of the IEEE Joint International Conference on Requirements Engineering (RE '02), 2002, 8 pages.
Hayes, J. H. et al., "Advancing Candidate Link Generation for Requirements Tracing: The Study of Methods," IEEE Transactions on Software Engineering, vol. 32, No. 1, 2006, pp. 4-19.
Hooks, I. F., "Managing Requirements," Crosstalk, The Journal of Defense Software Engineering, vol. 17, No. 8, Aug. 2004, 8 pages.
IBM DeveloperWorks: Rational Software Architect, printed from the internet at <http://www.ibm.com/developerworks/rational/products/rsa/> on Aug. 18, 2011, 2 pages.
IEEE Recommended Practice for Architectural Description of Software-Intensive Systems, The Institute of Electrical and Electronics Engineering, Inc., 2000, 29 pages.
IEEE Recommended Practice for Software Requirement Specifications, IEEE/ANSI Standard 830-1998, Institute of Electrical and Electronics Engineers, 1998, 39 pages.
IEEE Standard Glossary of Software Engineering Terminology, IEEE Std. 610.12-1990, Standards Coordinating Committee of the Computer Society of the IEEE, New York, Sep. 1990, 84 pages.
Ilieva, M. G. et al., "Automatic Transition of Natural Language Software Requirements Specification into Formal Presentation," Natural Language and Processing Information Systems, Lecture Notes in Computer Science, vol. 3513, copyright Springer-Verlag, 2005, pp. 392-397.
Jain, P. et al., "Automated Review of Natural Language Requirements Documents: Generating Useful Warnings with User-extensible Glossaries Driving a Simple State Machine," ISEC '09, ACM, 2009, pp. 37-45.
Jena—A Semantic Web Framework for Java, printed from the internet at <http://jena.sourceforge.net>, last retrieved on Oct. 10, 2008, 1 page.
Jirapanthong, W. et al., "XTraQue: traceability for product line systems," Software and Systems Modeling, vol. 8, 2009, pp. 117-144.
Keshav, R. et al., "Towards a Taxonomy of Architecture Integration Strategies," the 3rd International Software Architecture Workshop, 1998, 4 pages.
Kof, L., et al., "Faster from Requirements Documents to System Models: Interactive Semi-Automatic Translation with a tool that is learning on the fly," Requirements Engineering Efficiency Workshop, 17th International Working Conference on Requirements Engineering: Foundation for Software Quality, 2011, 41 pages.
Kosindrdecha, N. et al., "A Test Generation Method Based on State Diagram," Journal of Theoretical and Applied Information Technology, 2010, pp. 28-44.
Kruchten, P., "An Ontology of Architectural Design Decisions in Software-Intensive Systems," 2004, 8 pages.
Kruchten, P., "Architectural Blueprints—The "4+1" View Model of Software Architecture," IEEE Software, vol. 12, No. 6, 1995, 15 pages.
Lami, G. et al., "An Automatic Tool for the Analysis of Natural Langauge Requirements," published as Technical Report 2004-TR-40, Consiglio Nazionale delle Ricerche, Instituto di Scienza e Tecnologie dell'Informazione 'A.Faedo', 2004, 21 pages.
Lami, G., "QuARS: A Tool for Analyzing Requirements," Software Engineering Measurement and Analysis Initiative, Technical Report, 2005, 46 pages.
Lau, K-K. et al., "A Taxonomy of Software Component Models," Proceedings of the 2005 31st EUROMICRO Conference on Software Engineering and Advanced Applications, IEEE, 2005, 8 pages.
Li, L. et al., "A Software Framework for Matchmaking Based on Semantic Web Technology," in WWW, 2003, pp. 331-339.
Li, Y. et al., "Sentence Similarity Based on Semantic Nets and Corpus Statistics," IEEE Transactions on Knowledge and Data Engineering, vol. 18, No. 8, 2006, pp. 1138-1150.
Lin, D., "Dependency-Based Evaluation of MINIPAR," Text, Speech, and Language Technology 1, vol. 20, Treebanks, Part II, 2003, pp. 317-329.
Lin, D., "An Information-Theoretic Definition of Similarity," Proceedings of the 15th International Conference on Machine Learning 1, 1998, pp. 296-304.
Litvak, B. et al., "Behavioral Consistency Validation of UML Diagrams," Proceedings of the First International Conference on Software Engineering and Formal Methods, IEEE Computer Society, 2003, 8 pages.
Liu, D. et al., "Natural Language Requirements Analysis and Class Model Generation Using UCDA," IEA/AIE, Springer-Verlag, 2004, pp. 295-304.
Luisa, M. et al., "Market Research for Requirements Analysis Using Linguistic Tools," Requirements Engineering, vol. 9, No. 1, 2002, 26 pages.
Luo, L., "Software Testing Techniques: Technology Maturation and Research Strategy," Class Report for 17-939A, Institute for Software Research International, Carnegie Mellon University, 2009, 20 pages.
Maiden, N. A. et al., "Acquiring COTS Software Selection Requirements," IEEE Software, 1998, pp. 46-56.
Marcus, M. P. et al., "Building a Large Annotated Corpus of English: the Penn Treebank," Computational Linguistics, 1993, 22 pages.
Medvidovic, N. et al., "A Classification and Comparison Framework for Software Architecture Description Languages," IEEE Transactions on Software Engineering, vol. 26, No. 1, 2000, pp. 70-93.
Mehta, N. R. et al., "Towards a Taxonomy of Software Connectors," In Proceedings of the 22nd International Conference on Software Engineering, 2000, pp. 178-187.
Mihalcea, R. et al., "Corpus-based and Knowledge-based Measures of Text Semantic Similarity," in American Associate for Artificial Intelligence, 2006, 6 pages.
Miller, G. A., "Wordnet: A Lexical Database for English," Communications of the ACM, vol. 38, No. 11, 1995, pp. 39-41.
Morisio, M. et al., "Definition and Classification of COTS: A Proposal," ICCBSS, Orlando, FL, 2002, 10 pages.
Nanduri, S. et al., "Requirements Validation via Automated Natural Language Parsing," Proceedings of the 28th Annual Hawaii International Conference on System Sciences, IEEE, 1995, pp. 362-368.
Nebut, C. et al., "Automatic Test Generation: A Use Case Driven Approach," IEEE Transactions on Software Engineering, vol. 32, No. 3, 2006, pp. 140-155.
Neill, C. J. et al., "Requirements Engineering: The State of the Practice," IEEE Software, IEEE Computer Society, vol. 20, No. 6, 2003, pp. 40-45.
Offutt, J. et al., "Generating Tests from UML Specifications," U.S. National Science Foundation under grant CCR-98-04111 and

(56) References Cited

OTHER PUBLICATIONS

Rockwell Collins, Inc., Robert Franc and Bernhard Rurape (Eds.), '99, LNCS 1723, 1999, pp. 416-429.
OWL Web Ontology Language Overview, W3C, available from http://www.w3.org/TR/owl-features/, last retrieved on Oct. 10, 2008, 13 pages.
Paolucci, M. et al., "Semantic Matching of Web Services Capabilities," International Semantic Web Conference (ISWC), Sandinia, Italy, Jun. 9-12, 2002, pp. 333-347.
Phyu, A. L. L. et al., "Domain Adaptive Information Extraction Using Link Grammar and WordNet," Fifth International Conference on Creating, Connecting, and Collaborating through Computing, IEEE Computer Society, 2007, 7 pages.
Porter, M. F., "An Algorithm for Suffix Stripping," Program, vol. 14, No. 3, 1980, pp. 130-137.
Pyysalo, S. et al., "Analysis of Link Grammar on Biomedical Dependency Corpus Targeted at Protein-Protein Interactions," JNLPBA '04 Proceedings of the International Joint Workshop on Natural Language Processing in Biomedicine and its Applications, 2004, pp. 15-21.
Raven Professional Includes Five New Modules, Computer Magazine, Nov. 2006, p. 85.
Raven Software, URL: available at www.ravensoft.com last retrieved Aug. 26, 2010, 1 page.
Rech, J. et al., "Intelligent Assistance in German Software Development: A Survey," IEEE Software, vol. 24, No. 4, 2007, pp. 72-79.
Robinson, W. N. et al., "Requirements Interaction Management," ACM Computing Surveys, vol. 35, No. 2, Jun. 2003, pp. 1-59.
Robinson, W. N. et al., "Requirements Interaction Management," Georgia State University, Department of Computer Information Systems Working Paper 99-7, Aug. 30, 1999, 68 pages.
RosettaNet website, 2012, printed from the internet at <http://www.rosettanet.org/> on Feb. 21, 2012, 2 pages.
Rubinstein, D., "Quoth the Ravenflow: Drag-and_Drop Nevermor: Requirements Suite Generates UML Diagrams from Plain Text," Software Development Times, Mar. 15, 2006, Issue No. 146, 1 page.
Ryan, K., "The Role of Natural Language in Requirements Engineering," IEEE, 1992, pp. 240-242.
Schindler, E., "Learning to Speak 'User'," Digital Producer Magazine, Mar. 2006, 2 pages.
Schmerl, B. et al., "AcmeStudio: Supporting Style-Centered Architecture Development," In Proc. 2004 International Conference on Software Engineering, Edinburgh, Scotland, 2004, 2 pages.
Schmidt, D., "Model-Driven Engineering," IEEE Computer Society, 2006, pp. 25-31.
Selic, B. "The Pragmatics of Model-Driven Development," IEEE Software, 2003, pp. 19-25.
Shahin, M. et al., "Improving Understandability of Architecture Design through Visualization of Architectural Design Decision," SHARK '10, ACM, 2010, 8 pages.
Sharma, V. S. et al., "Extracting High-Level Functional Design from Software Requirements," 16th Asia-Pacific Software Engineering Conference, IEEE Computer Society, 2009, pp. 35-42.
Sinha, A. et al., "Text2Test: Automated Inspection of Natural Language Use Cases," 2010 Third International Conference on Software Testing, Verification and Validation, IEEE Computer Society, 2010, pp. 155-162.
Skyway software, printed from the internet at <http://www.skywaysoftware.com/> on Aug. 22, 2011, 3 pages.
Sleator, D. D. et al., "Parsing English with a Link Grammar," CMU Technical Report, 1991, 93 pages.
Sleator, D. D. et al., "Parsing English with a Link Grammar," In Third International Workshop on Parsing Technologies, 1993, 14 pages.
Sleator, D., "Link Grammar License," 2005, printed from the internet at <http://www.link.cs.cmu.edu/link/license.html> on Feb. 21, 2012, 1 page.
Sleator, D., "Summary of Link Types," 1998, 7 pages.
Sneed, H. M., "Testing Against Natural Language Requirements," Seventh International Conference on Quality Software, IEEE Computer Society, 2007, 8 pages.

Soffer, P. et al., "Modelling Off-the-Shelf Information Systems Requirements: An Ontological Approach," Requirements Engineering, vol. 6, 2001, pp. 183-199.
Sutton, S. M. et al., "Text2Test: Automated Inspection of Natural Language Use Cases," IBM Search Report, Computer Science, 2009, 11 pages.
The Declaration of Independence: Six Principles to Benefit You and Your Agile Organization, Better Software, www.StickMinds.com, Jun. 2006, pp. 24 and 36.
The Protege Ontology Editor and Knowledge Acquisition System, printed from the internet at <http://protege.stanford.edu/> on Aug. 16, 2011, 2 pages.
Tolvanen, J-P. et al., "Defining Domain-Specific Modeling Languages to Automate Product Derivation: Collected Experiences," SPLC 2005, pp. 198-209.
van Lamsweerde, A. et al., "Managing Conflicts in Goal-Driven Requirements Engineering," IEEE Transactions on Software Engineering, Special Issue on Managing Inconsistency in Software Development, Nov. 1998, pp. 1-21.
Verma, K. et al., "Requirements Analysis Tool: A Tool for Automatically Analyzing Software Requirements Documents," ISWC 2008, Springer-Verlag, 2008, pp. 751-763.
Wiegers, K. E., Software Requirements, Chapters 1-13, Microsoft Press, Redmond, 2003, 262 pages.
Wiegers, K. E., Software Requirements, Chapters 14-Appendix D, Microsoft Press, Redmond, 2003, 278 pages.
Wilson, W. M. et al., "Automatic Quality Analysis of Natural Language Requirement Specification," NASA, The Goddard Space Flight Center's Software Assurance Technology Center, http://satc.gsfc.nasa.gov/support/PNSQC-_OCT96/phq.html, dated Oct. 1996, pp. 1-19.
YACC, URL: available at http://dinosaur.compilertools.net/yaac, last retrieved Apr. 29, 2010, 24 pages.
Yoo, J. et al., "A Formal Software Requirements Specification Method for Digital Nuclear Plant Protection Systems," The Journal of Systems and Software, vol. 74, 2005, pp. 73-83.
Young, R.R. 2000 Effective Requirements Practices, Addison-Wesley Longman Publishing Co, Inc. 2001, 387 pages.
Zachos, K. et al., "Inventing Requirements from Software: An Empirical Investigation with Web Services," in 16th IEEE International Requirements Engineering Conference, IEEE Computer Society, 2008, pp. 145-154.
Zamin, N., "Information Extraction using Link Grammar," 2009 World Congress on Computer Science and Information Engineering, IEEE Computer Society, 2008, pp. 149-153.
Zimmermann, O. et al., "Managing Architectural Decision Models with Dependency Relations, Integrity Constraints, and Production Rules," Journal of Systems and Software, vol. 82, No. 8, Aug. 2009, 36 pages.
Notice of Allowance dated Jun. 22, 2012 for corresponding U.S. Appl. No. 12/558,483, 8 pages.
Allowed Claims for corresponding U.S. Appl. No. 12/558,483, 8 pages.
Notice of Allowance dated Jul. 23, 2012 for corresponding U.S. Appl. No. 12/121,503, 5 pages.
Allowed Claims for corresponding U.S. Appl. No. 12/121,503, 7 pages.
European Search Report dated Jul. 16, 2010 for EP Application No. 10000780.6, 8 pages.
Partial European Search Report dated Aug. 14, 2009 for EP Application No. 08020182.5, 6 pages.
Extended European Search Report dated Nov. 4, 2009 for EP Application No. 08020182.5, 9 pages.
Extended European Search Report dated Apr. 20, 2011 for EP Application No. 11001270.5-1238, 6 pages.
Statement in Accordance with the Notice from the European Patent Office dated Oct. 1, 2007 Concerning Business Methods, sent with Extended European Search Report, Nov. 2007, 2 pages.

\* cited by examiner

Agent Glossary 140

| Agent Descriptor 202 | Explanation 204 | Parent 206 | Additional Notes 208 |
|---|---|---|---|
| Cafeteria Staff | The Process Impact cafeteria currently employs about 20 Cafeteria Staff, who will receive orders from the Cafeteria Ordering System, prepare meals, package them for delivery, print delivery instructions, and request delivery. Most of the Cafeteria Staff will need to be trained in the use of the computer, the Web browser, and the Cafeteria Ordering Sytem. | | |
| Customer stakeholders | | | |
| Database administrator | | | |
| Developers | | Development team | |
| Development team | The entire team responsible for developing the system. | | |
| Downstream technical stakeholders | The team that will be responsible over time for deploying, managing, and maintaining the system. | | |

Figure 2

| 302 Mode | 304 Mode Glossary 306 | 144 |
|---|---|---|
| | Explanation | Additional Notes |
| Will | | |
| Shall | | |
| Must | | |
| May | | |
| Can | | |
| Needs to | | |
| No mode found | | |

Figure 3

Action Glossary 142

| Action 402 | Explanation 404 | Parent Action 406 | Additional Notes 408 |
|---|---|---|---|
| Recognize | | | |
| Color | | | |
| Maintain | | | |
| Underline | | | |
| Allow | | | |
| Identify | | | |
| Define | | | |
| Reduce | | | |
| Improve | | | |
| Create | | | |
| Support | | | |
| Outline | | | |
| Help | | | |
| Send | | | |
| Be | | | |
| Tag | | | |
| Show | | | |
| Store | | | |
| Email | Send | | |
| No action found | | | |

Figure 4

Phrase Glossary 146

| Problem Phrase 502 | Explanation 504 | Suggestion 506 | Priority 508 | Additional Notes 510 |
|---|---|---|---|---|
| could | is ambiguous, or inappropriate. Use 'shall' for requirements, 'will' for assumptions. | | 1 | |
| easy<br>easily<br>easy to use<br>user friendly | is often ambiguous; consider replacing with a specific description of the expected user profile, and expected time to competence or completion. | A user with <specify background> will be able to <specify function> with <specify effort><br><br>The system will reduce the effort required to <specify function> by x%<br><br>The system will require no more than <specify duration> time for a <specify user profile> to learn to use. | 1 | |
| efficiently | is ambiguous. Define quantitatively how efficient it is. | | 1 | |
| flexible | is a relative term. Make the forms of flexibility supported clear. | | 1 | |
| improved<br>better<br>faster<br>superior | is underspecified, unless it specifies how much faster, improved, better, or superior. | | 2 | |
| may | is ambiguous, or inappropriate. | | 1 | |

Figure 5

| Agent | Requirements |
|---|---|
| Release #1 | B01.1: Release #1 will reduce requirements-related defects by 20%. Release #1 will reduce requirements-related defects by 20%. |
| Release #2 | B01.2: Release #2 will reduce requirement-related defects by an additional 10%. B01.2: Release #2 will reduce requirement-related defects by an additional 10%. |
| Release #3 | B01.3: Release #3 will reduce requirement-related defects by an additional 10%. B01.3: Release #3 will reduce requirement-related defects by an additional 10%. |
| Release #3 | B01: The requirements initiative will reduce the cost of requirements-related defects by an average of 40%. B02: The requirements initiative will reduce time to complete requirements definition tasks by an average of 25%. |

| | | Relationship Glossary _2102 | |
|---|---|---|---|
| _2104 | _2106 | _2108 | _2110 |
| Class | Parent Class | Keywords | Relationships |
| Security | ReqType | | Affects: Time |
| Authentication | Security | Password, token, authentication, Kerberos | |
| Encryption | Security | Encrypt, SSH, RSA, DSA | |
| Time | ReqType | | |
| Query Time | Time | Query time, querytime | |
| Response Time | Time | Response, respond | |

DOCUMENT ANALYSIS, COMMENTING, AND REPORTING SYSTEM

CROSS REFERENCE TO RELATED APPLICATIONS

This application is a continuation of, and claims the benefit of priority to, U.S. patent application Ser. No. 12/121,503, filed May 15, 2008, the entirety of which is incorporated by reference herein, which is a continuation-in-part of U.S. patent application Ser. No. 11/945,958, filed Nov. 27, 2007, the entirety of which is incorporated by reference herein.

BACKGROUND OF THE INVENTION

1. Technical Field

This application relates to document analysis, and in particular relates to tailored analysis of specific document types, such as requirements specifications.

2. Related Art

Rapid developments in computer technology have given rise to the widespread adoption of document authoring applications. Today, a significant portion of the modern workforce generates documents using a word processor. Unfortunately, the writing skills of the typical individual have not improved at anywhere near the pace of technology. As a result, computer technology often results in faster generation of poorly written documents, rather than in efficient production of clear, consistent, and unambiguous work product.

At the same time, significant technical challenges exist in analyzing and providing constructive feedback on documents. The documents themselves vary widely in purpose, format, and content, and there is no general flexible and adaptable framework in place for specific document analysis, commenting, or reporting. Document authoring applications only provide basic tools that cooperate with authors to improve document quality. As examples, analysis tools such as spell checkers and grammar checkers only provide analysis at a general level, such as checks of the fundamental rules of a given language. In other words, the specialized nature of many documents defeats more specific analysis that could provide meaningful criticism on a document and vastly improve the substantive content of a document.

Poorly written documents have many adverse and costly consequences. Vague or ambiguous terms create misunderstandings and misinterpretations. Poor formatting frustrates testing and validation procedures. Failure to clearly separate concepts results in extra work needed to untangle and factor concepts into individual pieces. Contradictory statements, which often arise in lengthy, complex documents, create extra work to resolve the meaning and intended purpose of passages in the document. Inconsistent terms leave different readers with different, possibly inconsistent, expectations regarding specific parts of the document.

One specific application of the system described below is to analyze requirements documents. Requirements documents mediate between stakeholder objectives and the solution that developers will create to achieve the objectives. A successful requirements process is one that creates requirements documentation that captures stakeholder needs, sets stakeholder expectations, and may be used by developers to create a solution which satisfies the stakeholder's needs and expectations. Unsuccessful requirements processes result in requirements that do not ensure that stakeholders understand what they will be getting or that developers will build something that is ultimately going to satisfy the stakeholder's needs.

While creating a good, clear requirements document may sound straightforward, it is not. For large software systems it is extremely difficult to create good requirements documents. Furthermore, defects in the requirements process are very expensive. Incorrect, incomplete, or unclear requirements are the most common cause of software defects, and problems resulting from requirements defects are also the most expensive kinds of "bugs" to fix.

Some existing tools primarily concentrate of maintaining requirements and test scripts after a baseline requirements set has been defined. However, this is only part of the story. Many of the most costly requirements defects happen during the definition process, resulting in a baseline that is of poor quality, and prior tools are agnostic to the quality of the requirements or of the definition process and therefore provide no aid in that regard.

A need exists for improved document analysis tools that address the problems noted above and other previously experienced.

SUMMARY

A document analysis, commenting, and reporting system provides tools that automate quality assurance analysis tailored to specific document types. As one example, the specific document type may be a requirements specification. In that role, the system may tag different parts of requirements, including actors, entities, modes, and a remainder. However, the flexibility of the systems permits analysis of any other document type, such as contracts or patent applications. The system helps avoid confusion over the document when it is delivered because of non-standard terms, ambiguous language, conflicts between document sections, incomplete or inaccurate descriptions, size and complexity of the document, and other issues.

The system provides many benefits. As examples, the system may help reduce rework by improving accuracy, completeness, and clarity of documents; may reduce time spent in the creating the document; and may reduce time-to-competence for inexperienced document creators. As other examples, the system may enhance the results of tasks that rely on the document, due to improved accuracy, completeness, and clarity of the document; increase team morale and writer retention, resulting from reductions in miscommunication, confusion and project chaos that results from document defects; and increase client satisfaction, resulting from projects that more consistently deliver what the client really needs, on time and on budget.

The system implements a language based analysis that detects and critiques poor writing practices such as: using ambiguous terms (e.g. 'quickly', 'well', 'sufficient') and using conjunctions and disjunctions to combine different document structures. The system also provides a domain knowledge based analysis that helps to enforce a standard vocabulary of entities and actions, find conflicts between document structures, and find conflicts between document structure and business rules. The system supports many different types of documents and generates meaningful reports by agent, action, or other document content.

In one implementation, the system may be a Visual Basic for Applications plug-in for the Word 2007™ word processor. In that regard, the system may provide a specific ribbon interface. The system may be implemented in many other ways, however, such as a stand alone application, web service, or shared function library.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 2 shows an example of an agent glossary.

FIG. 3 illustrates an example of a mode glossary.

FIG. 4 shows an example of an action glossary.

FIG. 5 illustrates an example of a problem phrase glossary.

FIG. 14 shows an example report.

FIG. 21 shows an example of a requirements relationship glossary.

DETAILED DESCRIPTION OF THE PREFERRED EMBODIMENTS

Figure 1:
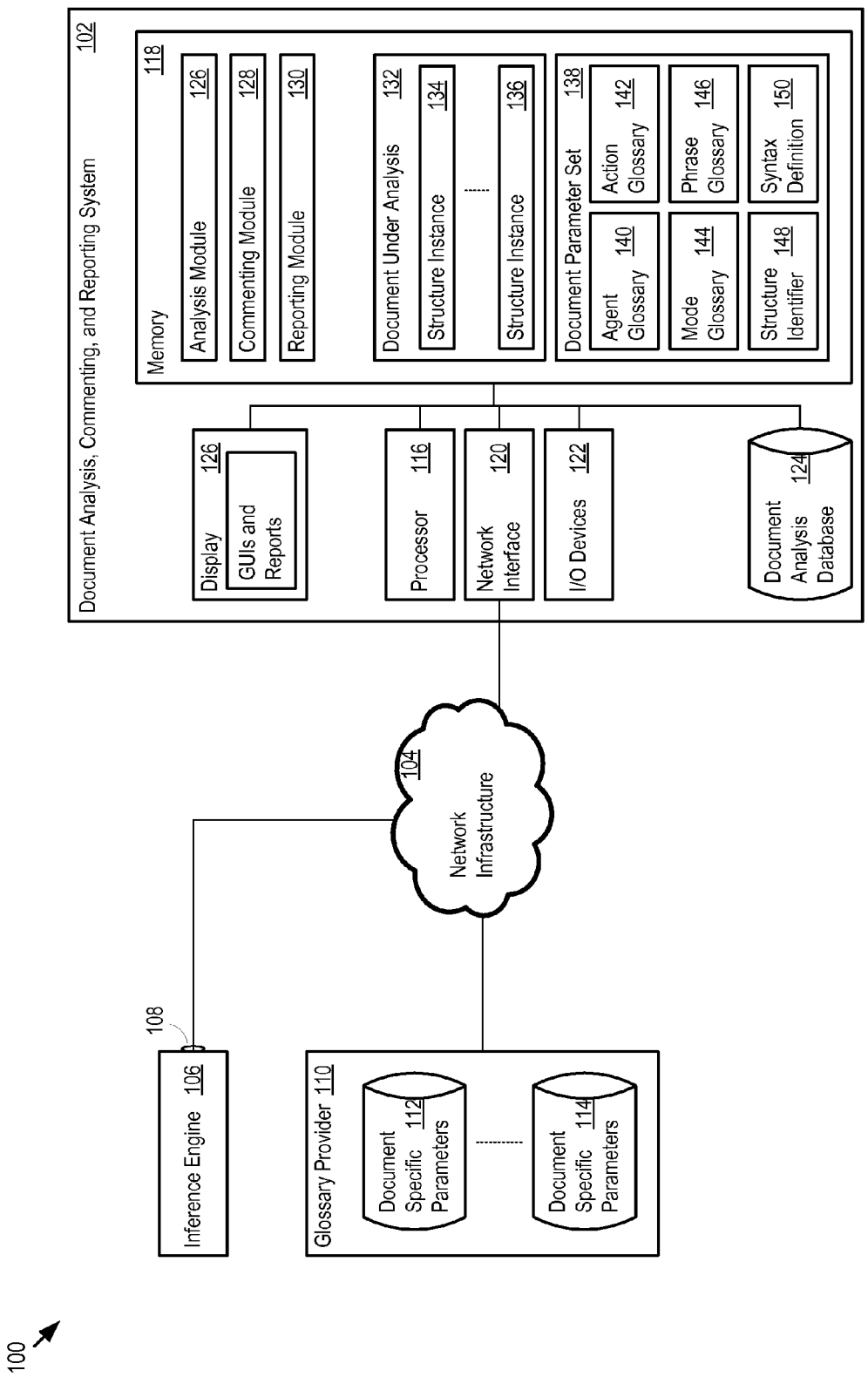
FIG. 1 shows a network including a document analysis system in communication with other systems.

FIG. 1 shows a network 100 including a document analysis, commenting, and reporting system 102 ("system 102"). The system 102 is connected to the network infrastructure 104. Through the network infrastructure 104, the system 102 may communicate with an inference engine 106, such as by a web services interface 108, and with other entities, such as the glossary provider 110. The system 100 may analyze a wide range of document types, with analysis tailored for the specific document type in question. In one implementation, the system 100 includes the document parameter sets that tailor analysis to any specific document type. However, in other implementations, the system 100 may receive new document parameter sets or update existing document parameters sets by coordinating with the glossary provider 110. To that end, the glossary provider 110 may maintain a database of many different document specific parameter sets, two of which are labeled 112 and 114.

The system 102 includes a processor 116, memory 118, network interface 120, I/O devices 122, and a document analysis database 124. The system 102 also includes a display 126 on which graphical user interfaces (GUIs) and analysis reports are rendered, as noted below. The document analysis database 124 may store document parameter sets that tailor the operation of the system 102 to any desired document type.

In the example shown in FIG. 1, the memory 118 includes an analysis module 126, a commenting module 128, and a reporting module 130. Each of the modules 126-130 is described in more detail below, and each module may be used alone or in combination with other modules to assess a document under analysis 132 ("document 132"). The document 132 may be any form of document, such as a word processor document, spreadsheet document, or text file. In addition, the document may be any specific type of document, such as a requirements specification, patent application, contract, building specification, or other document type.

As will be described in more detail below, the document 132 includes any number of document structure instances (e.g., the document structure instances 134 and 136). Each document structure instances represents a unit of content for analysis by the modules 126-130. As examples, a document structure instance may be a word, phrase, sentence, or paragraph. Other examples of document structure instances include arbitrary sequences of characters (e.g., serial numbers, email addresses, or encryption keys).

Yet another example of document structure instances are requirements statements. Requirements statements may take any number of forms, such as a requirement statement identifier, followed by a requirement sentence containing an actor, modal verb, action, and statement remainder. The discussion below uses examples of processing on requirements statements found in requirements documents. However, the system 102 may analyze any specific type of document, with any particular form of document structure instances.

The modules 126-130 analyze the document 132 in a manner tailored to the type of document. To that end, the modules 126-130 access a document specific parameter set which may be retrieved from the document analysis database 124, preconfigured in a word processor or other application, predefined as individual files stored in memory, or otherwise obtained or provided to the modules 126-130. FIG. 1 shows an example of a document specific parameter set 138. Any of the information in the document specific parameter set 138 may be made read-only, read-write, or have attached access control permissions for specific users or groups.

The document specific parameter set 138 may include one or more glossaries for analyzing a document. The glossaries may be spoken language glossaries, written language glossaries, language specific glossaries, document property glossaries, or other types of glossaries, which may store language components such as words, phrases, or other language constructs for analysis. Examples of spoken language glossaries include glossaries having words from the English language, words from the Russian language, words form the Japanese language, or words from Latin or non-Latin languages. Spoken language glossaries may also include words from multiple different spoken languages. Accordingly, the system may perform a multiple language analysis on a document that includes many languages without having to load or unload glossaries specific to each language and separately perform multiple processing passes.

Examples of written language glossaries include glossaries having words from the English language, words from the Russian language, or words from a Latin or non-Latin language. A written language glossary may have words depicted in print, script, cursive, or any other font. In other words, the written language glossary may include visual language indicia that the system may analyze to determine, for example, whether a language construct is vague or ambiguous. A written language glossary may also include words from one or more written languages, or from words contained in a spoken language glossary. Accordingly, the system may also perform multiple language analysis with written languages.

Examples of language specific glossaries include glossaries having words from computer programming languages, words made up of symbols or other non-alphanumeric characters, or components of any other non-written or non-spoken languages. Examples of document property glossaries include glossaries having words describing document properties, such as the margins of a document, the number of pages in a document, the permissible or non-permissible fonts in a document, or other document property. As a result, the system may extend its processing to document properties beyond language constructs, to help critique a document in other meaningful ways.

In one embodiment, the document parameter set 138 includes an agent glossary 140, an action glossary 142, a mode glossary 144, and a phrase glossary 146. The document specific parameter set 138 further includes a structure identifier 148 and a syntax definition 150. The structure identifier 148 may define a label that flags a portion of the document as a structure instance for analysis. The syntax definition 150 may define the expected syntax for the structure instance. In one implementation, the system 102 analyzes a received document to determine a document type, and then retrieves the document specific parameter set 138 corresponding to the determined document type. For example, the system 102 may retrieve the syntax definition 150, the structure identifier 148, the glossaries 140-146, or other document parameters corresponding to the determined document type. One example of a document type is a requirements document.

In the context of a requirements specification, the structure identifier 148 may be a regular expression, such as "[A-Za-z0-9]*[0-9]". The regular expression specifies that any combination of uppercase letters, lower case letters, and digits, followed by a digit, flags the following sentence as a requirement to analyze. An example syntax definition is: [agent] [mode] [action] [remainder]. The syntax definition specifies structure category components for the document structure. In this example, the structure category components include an agent, followed by a modal verb, followed by an action, followed by the rest of the sentence.

The agent glossary 140 defines the permissible agents. The mode glossary 144 defines the permissible modal verbs. The action glossary 142 defines the permissible actions. The system 102 may enforce the syntax, by performing processing only on those sentences that meet the syntax with agents, modes, and actions defined in the glossaries 140-144, or may perform processing on a sentence that partially or wholly meets the syntax. For example, even if an actor is missing or an unrecognized actor is present, the system 102 may still analyze the remainder for ambiguous terms.

FIG. 2 shows an example of the agent glossary 140. In the example shown in FIG. 2, the agent glossary 140 defines an agent field 202, an explanation field 204, a parent field 206, and a notes field 208. The agent field 202 defines permissible constituent agents for the structure instance syntax, such as "Developers" and "Development Team". The explanation field 204 provides diagnostic information relevant to the agent, how the agent performs their job, or other agent related information. The parent field 206 may be used to indicate a constituent hierarchy parameter for building hierarchies of agents, as will be described in more detail below. The additional notes field 208 provides a place where developers may insert information regarding a particular agent and its presence in the agent glossary 140. One of the uses of the agent glossary 140 is to check that the requirements document only specifies that certain actors perform actions.

FIG. 3 shows an example of the mode glossary 144. In the example shown in FIG. 3, the mode glossary 144 defines a mode field 302, an explanation field 304, and a notes field 306. The mode field 302 defines permissible constituent modes for the actions that an agent may take, such as "must", or "will", while the explanation field 304 provides diagnostic information related to the mode. The diagnostic information may expresses issues or concerns about certain modes, may recommend or encourage certain modes, or may provide other mode related information and feedback.

FIG. 4 shows an example of the action glossary 142. In the example shown in FIG. 4, the action glossary 142 defines an action field 402, an explanation field 404, a parent field 406, and a notes field 408. The action field 402 defines permissible constituent actions for the structure instance syntax, such as "Define" and "Tag". The explanation field 404 provides diagnostic information relevant to the action, how an agent performs the action, or other action related information. The parent field 406 may be used to build hierarchies of actions, as will be described in more detail below. The additional notes field 408 provides a place where developers may insert information regarding a particular action and its presence in the action glossary 142. The system 102 may use the action glossary 142 to check that the only certain actions are specified in a requirements document.

FIG. 5 shows an example of the phrase glossary 146. In the example shown in FIG. 5, the phrase glossary 146 defines a problem phrase field 502, an explanation field 504, a suggestion field 506, a priority field 508, and a notes field 510. The problem phrase field 502 defines words or combinations or words that often give rise to problematic statements. Such problem phrases may define ambiguous or inappropriate words, such as "could", or "improved", particularly in the context of the specific document type. The problem phrases may also include industry, domain, or technology phrases, such as "Windows Mobile" or "strong encryption." Thus, the document specific parameter sets tailor the analysis of the system 102 to the particular document type.

The explanation field 504 provides a description of why the problem phrase gives rise to difficulties. For example, the problem phrase "could" may be associated with the corresponding explanation of "is ambiguous". The phrase glossary 146 may also define suggestions in the suggestion field 506, explanation field 504, or both, for how to improve the problem phrase to a less problematic state. For example, the suggestion field 506 may suggest that "easy" should be replaced with specific language, such as "The system will reduce the effort required to <function> by x %." The document reviewer may then adopt the suggestion, complete the <function> field, and specify a value for 'x' to improve the statement.

The priority field 508 assigns a priority value to a problem phrase. The system 102 may then prioritize analysis and evaluation of problem phrases. As examples, the system 102 may determine which colors or patterns to use to highlight problem phrases according to the priority value. As another example, the system 102 may more strongly encourage the reviewer to modify the problem phrase, provide additional suggestions, or take other actions driven by the priority value. The additional notes field 510 provides a place where developers may insert information regarding a particular problem phrase and its presence in the phrase glossary 146.

Figure 6:
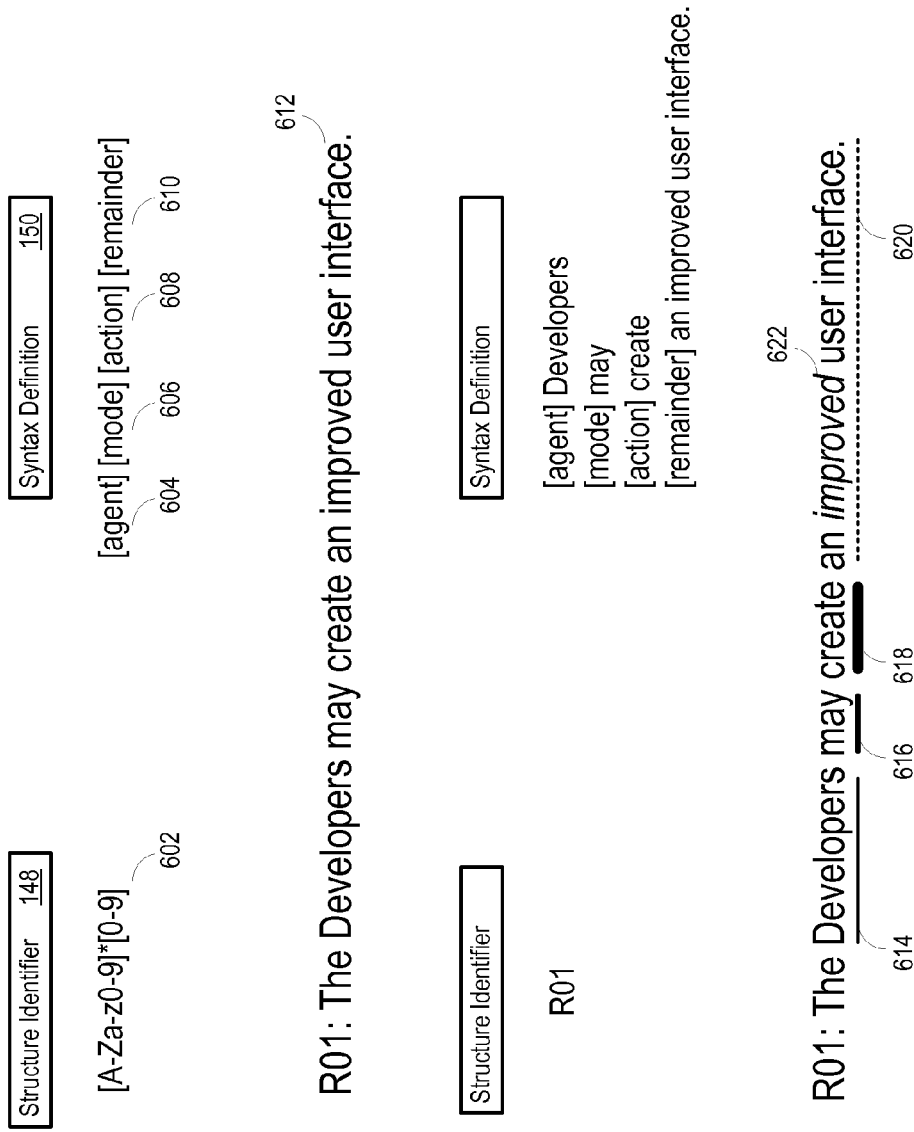
FIG. 6 shows an example of a structure identifier and a syntax definition.

FIG. 6 illustrates examples of a structure identifier 148 and a syntax definition 150 for a requirements specification. The structure identifier 148 is the regular expression "[A-Za-z0-9*0-9]" 602. The regular expression specifies that any combination of alphanumeric characters, followed by a digit, flags the following sentence as a requirement to analyze. The syntax definition 150 is: [agent] [mode] [action] [remainder]. The structure category components specified by the syntax definition are an agent component 604, followed by a modal verb component 606, followed by an action component 608, followed by a remainder component 610 of the rest of the sentence.

FIG. 6 also shows an example requirement 612: "R01: The Developers may create an improved user interface." found in the text of the document 132. The system 102 parses the document text, finding first the structure identifier "R01" that matches the structure identifier 148. According, the requirement sentence that follows is next checked against the syntax definition 150. In this instance, the syntax definition, supported by the glossaries 140-144, parse the sentence as follows: Agent=Developers, Mode=may, Action=create, and Remainder="an improved user interface."

The system 102 may carry out document analysis operations based on the analysis of the document structure instances. In the example shown in FIG. 6, the system 102 highlights each structure category component, using a thin line 614 for the agent, a medium line 616 for the modal verb, and a heavy line weight 618 for the action. The system 102 uses a dashed line 620 for the remainder.

In addition, the system 102 applies the phrase glossary 146 against the requirement sentence. As a result, the system 102 identifies the ambiguous term "improved" in the requirement sentence, and applies an italic highlight 622 to emphasize the presence of the problematic word. The system 102 may use any combination of any desired colors, line weights, line patterns, sounds, animations, icons, or other indicia to highlight any of the structure components, problem phrases, structure identifiers, or other parts of the document.

In addition to the syntax definition shown in FIG. 6, additional syntax definitions are also possible. For example, the syntax definition 150 may define conditional syntax definitions or feature syntax definitions. Table 1 below lists different examples of syntax definitions definable by the syntax definition 150.

TABLE 1

| Syntax Type | Syntax Definition Example | Structure Instance Example |
| --- | --- | --- |
| Statement | [agent] [mode] [action] [remainder] | The order-processing system shall send a message to the procurement manager. The user shall click the button |
| Conditional | When [condition], [agent] [mode] [action] [remainder] | When the user clicks the button, the order-processing system shall send a message to the procurement manager. |
| Conditional: | If [condition] then [agent] [mode] [action] [rest] | If the user clicks the button, the order-processing system shall send a message to the procurement manager. |
| Feature | [system-agent] [mode][remainder] | The order-entry interface shall have a 'cancel' button. |

In one implementation, the syntax definition 150 further defines syntax definitions according to a set of controlled document structure instance syntaxes. For example, the syntax definition 150 may define a document structure instance as a requirement document structure instance. The requirement document structure instance may then be defined as a conditional requirement document structure instance or as a simple requirement document structure instance. The set of controlled document structure instance syntaxes may also define additional syntaxes for the simple requirement document structure instance or the conditional requirement document structure instance. For example, the set of controlled document structure instance syntaxes may define the simple requirement document structure instance as a standard requirement document structure instance, as a business rule document structure instance, or as any other type of document structure instance. Table 2 illustrates one example of a set of controlled document structure syntaxes that may be defined according to the syntax definition 150. Other types of syntaxes may also be defined.

TABLE 2

| Syntax Type | Syntax Identifier | Syntax | Brief Explanation |
| --- | --- | --- | --- |
| Requirement | Req. | Req. –> ConditionalReq \| SimpleReq | A requirement may be a simple requirement or a conditional requirement. |
| Conditional | ConditionalReq. | ["if"][condition]["then"] [SimpleReq]; or ["if"][condition]["then"] [SimpleReq]["else"] [SimpleReq]; or ["when"][condition] [SimpleReq] | A conditional requirement may be an "if-then", "if-then-else", or "when" kind of document structure instance. It may be either a functional requirement or business rule depending on the text of the document structure instance. |
| Standard | StandardReq | [Agent] [ModalWord] [Action] [Rest] | A standard requirement may be an agent followed by a modal word, followed by an action (verb), followed by the remainder of the document structure instance. |

TABLE 2-continued

| Syntax Type | Syntax Identifier | Syntax | Brief Explanation |
|---|---|---|---|
| Business Rule | BusinessRule | ["all" \| "only" \| "exactly" ] [Rest] | A business rule may be any document structure instances that starts with "all", "only" or "exactly". |
| Remainder | Rest | [rest] –> [Secondary Agent \| Secondary Action] | The rest of sentence may contain a number of secondary agents and actions from their respective glossaries. |

Figure 7:
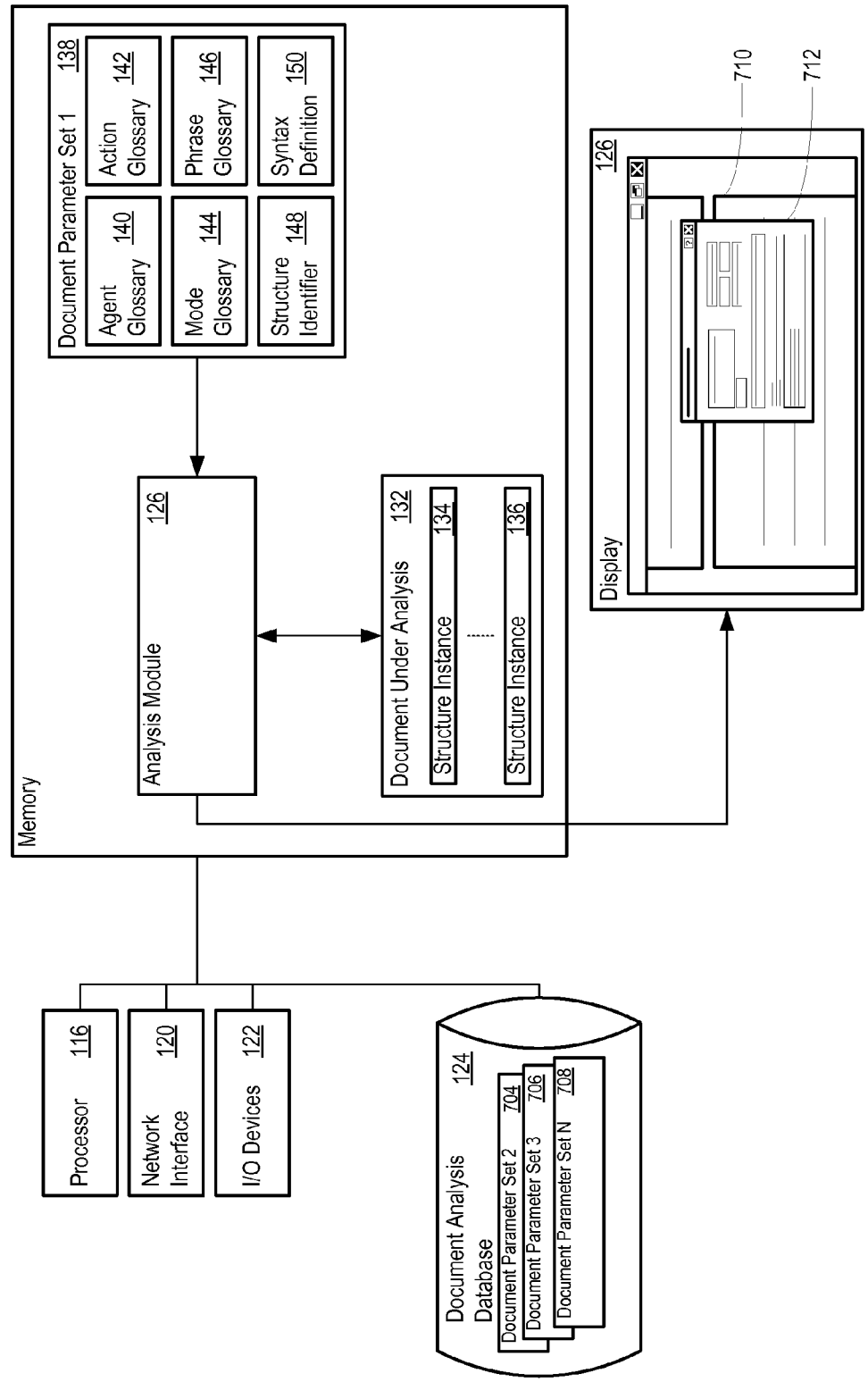
FIG. 7 shows a requirements analysis system.

FIG. 7 illustrates an example of a requirements analysis system 702. In the example shown in FIG. 7, the requirements analysis system 702 includes the document analysis module 126 in communication with a document under analysis 132 and the first document specific parameter set 138. The document analysis module 126 may also be in communication with the document analysis database 124 to retrieve one or more document specific parameter sets 706-708. The analysis module 126 is also in communication with the processor 116, the network interface 120 and various other input/output devices 122. As shown in FIG. 7, the document specific analysis module is in communication with the display 126, which may display an electronic representation 710 of the document under analysis 132 and a graphical user interface 712 for interacting with the document analysis module 126.

In general, the document analysis module 126 is operative to analyze the document instances 134-136 of the document under analysis 132. For example, when analyzing the document structure instance 134, the document analysis module 126 may determine whether the document structure instance 134 is a requirement statement. The pseudo-codes below illustrate several methods that the document analysis module 126 may perform in determining whether the document structure instance 134 is a requirement statement according to the syntax definition 150. The first pseudo-code below illustrate one method that the document analysis module 126 may use to determine whether the document structure instance 134 contains a structure identifier:

```
isRequirement (Document structure instance s)
   if the first word of the document structure instance s has a structure
   identifier:
         return true
   end if
      else
            return false
      end else
end isRequirement
```

In addition, the document analysis module 126 may determine whether the document structure instance 134-136 includes any of the constituents in glossaries 140-146 consistent with the syntax definition 150. More specifically, the document analysis module 126 may determine whether a document structure instance 134, such as a requirements statement of a requirements document, includes a constituent from the agent glossary 140. In an alternative example, the document analysis module 126 may determine whether a document structure instance 134 includes a constituent from the phrase glossary 146, the mode glossary 144, the action glossary 142, or another glossary from another document parameter set 704-708.

The pseudo-code below illustrates one method for identifying whether the document structure instance 134 contains an agent constituent:

```
FindAgent(Document structure instance s)
   For each agent_i in AgentGlossary
         If agent_i is the first phrase in the document structure instance
         after the structure identifier
               return true
         end if
   end for
   return false
end FindAgent
```

The pseudo-code below illustrates one method for identifying whether the document structure instance 134 contains a mode constituent:

```
FindMode(Document structure instance s)
   For each mode in ModeGlossary
         If mode is the second phrase in the document structure instance
         after the agent phrase
               return true
         end if
   end for
   return false
end FindMode
```

The pseudo-code below illustrates one method for identifying whether the document structure instance 134 contains an action constituent

```
FindAction(Document structure instance s)
   For each action in ActionGlossary
         If action is the third phrase in the document structure instance
         after the mode phrase
               return true
         end if
   end for
   return false
end FindAction
```

The pseudo-code below illustrates one method for identifying whether the document structure instance 134 contains a constituent from the phrase glossary 146:

```
   FindPhrase(Document structure instance s)
      For each phrase_i in PhraseGlossary
            If phrase_i occurs in the document structure instance
                  return true
            end if
      end for
      return false
   end FindPhrase
```

The document analysis module 126 may further perform a document analysis operation based on whether the document structure instances 134-136 include any of the constituents in a glossary 140-146 consistent with the syntax definition 150. Examples of performing a document analysis operation include identifying a problematic constituent, identifying a constituent from the glossaries 140-146 contained in the document structure instances 134-136, identifying that the document structure instances 134-136 do not contain a constituent from the glossaries 140-146, or identifying whether the document structure instances 134-136 are consistent with the syntax definition 150. In addition, where the document analysis module 126 identifies an error or issue in the analyzed document structure instance, the document analysis module 126 may provide a suggestion for correcting or rectifying the identified error or issue.

The document analysis module 126 may also communicate with the inference engine 106 to determine whether one or more document structures instances 134-136 conflict using the document parameter set 138. For example, the document parameter set 138 may include one or more document structure rules relating to the substantive nature of the document structure instances 134-136. The document analysis module 126 may transmit the document structure instances 134-136, along with the document structure rules, to the inference engine 106 to determine whether the document structure instances 134-136 substantively conflict.

For example, suppose that the document structure rules include a rule stating that "Encryption delays a message by five seconds," and the document structure instances include first a document structure instance stating that "The system will encrypt all messages" and a second document structure instance stating that "The system will send all messages in less than five seconds." By transmitting the document structure rule along with each of the two document structure instances of the above example to the inference engine 106, the document analysis module 126 is able to report that the document structure instances conflict with one another.

The document analysis module 126 may also use a constituent hierarchy parameter, such as the parent field 206 of the agent 140, when analyzing the document structure instances 134-136. The document analysis module 126 may use the constituent hierarchy parameter to identify whether the document structure instances 134-136 conflict with a document structure rule. For example, as shown in FIG. 2, the parent field 206 of the agent glossary 140 identifies that "developers" are subordinate to "development team." Where a document structure rule states that "Only a development team shall contact suppliers" and a document structure instance states that "Developers will contact suppliers," the document analysis module 126 determines that the document structure instance does not conflict with the document structure rule.

As another example of using document structure rules to analyze document structure instances, suppose that a first business rule states that "If an order is to be delivered, the patron must pay by payroll deduction" and a second business rule states that "Only permanent employees may register for payroll deduction for any company purchase." The system 102 may then infer that the inferred business rule from the first and second business rule is that "Only a permanent employee can specify that an order can be picked up." Accordingly, the document analysis module 126 may output an alert where a document structure instance states that "The Patron shall specify whether the order is to be picked up or delivered." The document analysis module 126 may also communicate with the inference engine 106 to perform the analysis on the document structure instances 134-136 using the document structure rules.

The document analysis module 126 may also determine whether the document under analysis 132 contains document structure instances 134-136 of a specific type of document structure instance. For example, the document analysis module 126 may compare the document parameter set 138 to determine that the document under analysis 132 does not contain document structure instances of a security type. The document analysis module 126 may also determine whether the document structure instances 134-136 are complete. For example, a document structure instance conforming to a conditional syntax definition may have an "if" statement and no "else" statement. In this example, the document analysis module 126 may output an alert indicating that the document structure instance is an incomplete conditional structure instance.

The document analysis module 126 may also determine whether the document structure instances satisfy a priority given to a property or other document structure instance. For example, the document parameter set 138 may specify that user interface document structure instances are given the highest priority level. In analyzing the document under analysis 132, the document analysis module 126 may determine and identify whether any of the document structure instances are directed to a user interface.

In addition, the document analysis module 126 may further identify document structure instances for which a complementary document structure instance appears to be missing. For example, a document structure instance may specify that "System X will send an alert to System Y." The document analysis module 126 is operative to determine whether a similar document structure instance states that System Y should process alerts sent by System X.

Figure 8:
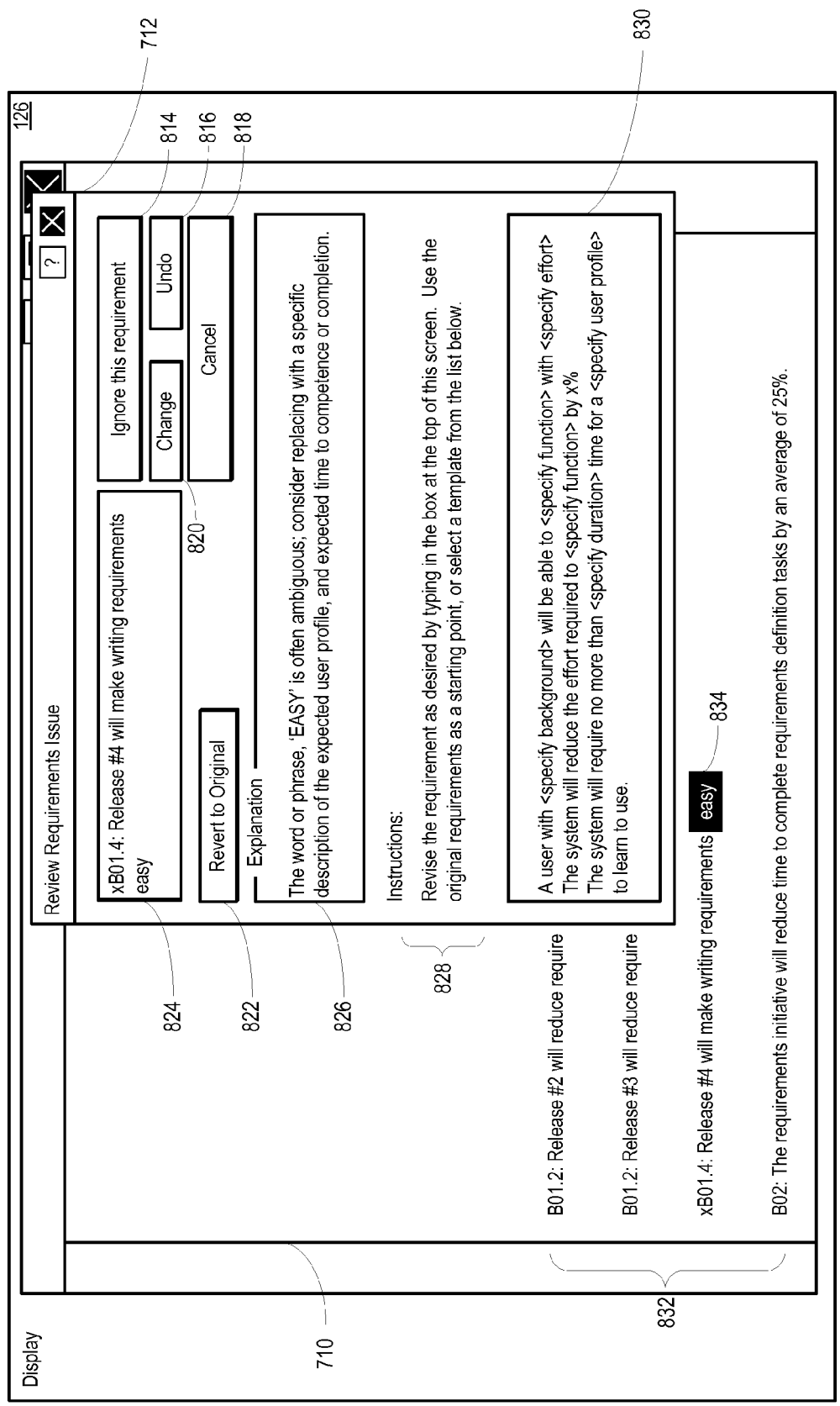
FIG. 8 shows a requirement analysis user interface.

The document analysis module 126 may also be in communication with a graphical user interface 712 for communicating analysis messages relating to the analysis of document structure instances 134-136. FIG. 8 shows one example of a graphical user interface 712 for communicating analysis messages relating to the analysis of a document structure instance. The graphical user interface 712 shown in FIG. 8 has been configured to communicate analysis messages associated with the phrase glossary 146. Other graphical user interfaces may also be configured for each of the other glossaries, including the agent glossary 140, the action glossary 142, and the mode glossary 144.

The graphical user interface 712 associated with the phrase glossary 146 includes several control parameters 814-822, including an "ignore this requirement" control parameter 814, a "change" control parameter 820, an "undo" control parameter 816, a "cancel" control parameter 818, and a "revert to original" control parameter 822. Each of the control parameters 814-822 are associated with an instruction for the document analysis module 126. For example, selecting the "ignore this requirement" control parameter 814 instructs the document analysis module 126 that it should ignore the analyzed document structure instance; selecting the "change" control parameter 820 instructs the document analysis module 126 that it should change the document structure instance; selecting the undo control parameter 816 instructs the analysis module 126 that it should undo the last change applied to the document structure instance; selecting the cancel control parameter 818 instructs the document analysis module 126 that it should cancel the analysis of the document structure instance; and, selecting the revert to original control parameter 822 instructs the document analysis module 126 that it should revert the document structure instance to its original form as it appeared before the analysis by the document analysis module 126.

The graphical user interface 712 also includes several different text fields 824-830. The text fields 824-830 include a document structure instance text field 824, an explanation text field 826, an instruction text field 828, and a suggested change text field 830. The text fields 824-830 may be associated with fields 502-506 of the phrase glossary 146, with fields from the document parameter set 138, or with fields from the document analysis database 124. For example, as shown in FIG. 8, the suggested text field 830 of the graphical user interface 712 is associated with the suggestion field 506 of the phrase glossary 146. Similarly, the explanation text field 826 is associated with the explanation field 504 of the phrase glossary 146. The document analysis module 146 is operative to populate the text fields 828-830 with the analysis messages of their associated fields. Other graphical user interfaces associated with the other glossaries 140-144 may include additional or fewer control parameters, or additional or fewer text fields.

In FIG. 8, the document analysis module 126 is analyzing document structure instances 832 using the constituent "easy" from the phrase glossary 146. The document analysis module 126 has identified an ambiguous phrase 834 in one of the document structure instances. Having identified a constituent from the phase glossary 146, the document analysis module 126 has retrieved several analysis messages associated with the constituent "easy" and has populated the text fields 824-830 of the graphical user interface 712 with those analysis messages. The document analysis module 126 has populated the document structure instance text field 824 with the text of the document structure instance having the found constituent. The document analysis module 126 has also populated the explanation text field 826 with an analysis message indicating the reason for identifying the constituent of the document structure instance. The document analysis module 126 has further populated the instruction text field 828 with an analysis message indicating how to resolve the identified issue presented in the explanation text field 826, and the document analysis module 126 has populated the suggested text field 830 with analysis messages to replace the text of the identified constituent or the text of the analyzed document structure instance.

The text fields 824-830 may also be associated with the control parameters 814-822. For example, in one implementation, the suggested text field 830 is associated with the change control parameter 820. Thus, when an analysis message is selected from the suggested text field 830 and the change control parameter 820 is activated, the document analysis module 126 may replace the document structure instance text in the document structure instance text field 824 with the selected analysis message from the suggested text field 830. The document analysis module 126 may further change the document under analysis to reflect the changes made to the analyzed document structure instance of the document under analysis.

In addition that the graphical user interface 712 of FIG. 8 may indicate that the document analysis module 126 has found a constituent from the phrase glossary 146 in the analyzed document structure instance, other graphical user interfaces may indicate that the document analysis module 126 has not found a constituent from other glossaries. For example, a graphical user interface associated with the agent glossary 140 may present an analysis message indicating that the document analysis module 126 did not find an agent constituent in the analyzed document instance. Similarly, a graphical user interface associated with the action glossary 140 may present an analysis message indicating that the document analysis module 126 did not find an action constituent in the analyzed document instance. More generally, the requirements analysis system 702 may be configured such that a graphical user interface is associated with each of the document parameters of the document parameter sets for displaying the analysis of the document analysis module 126.

Figure 9:
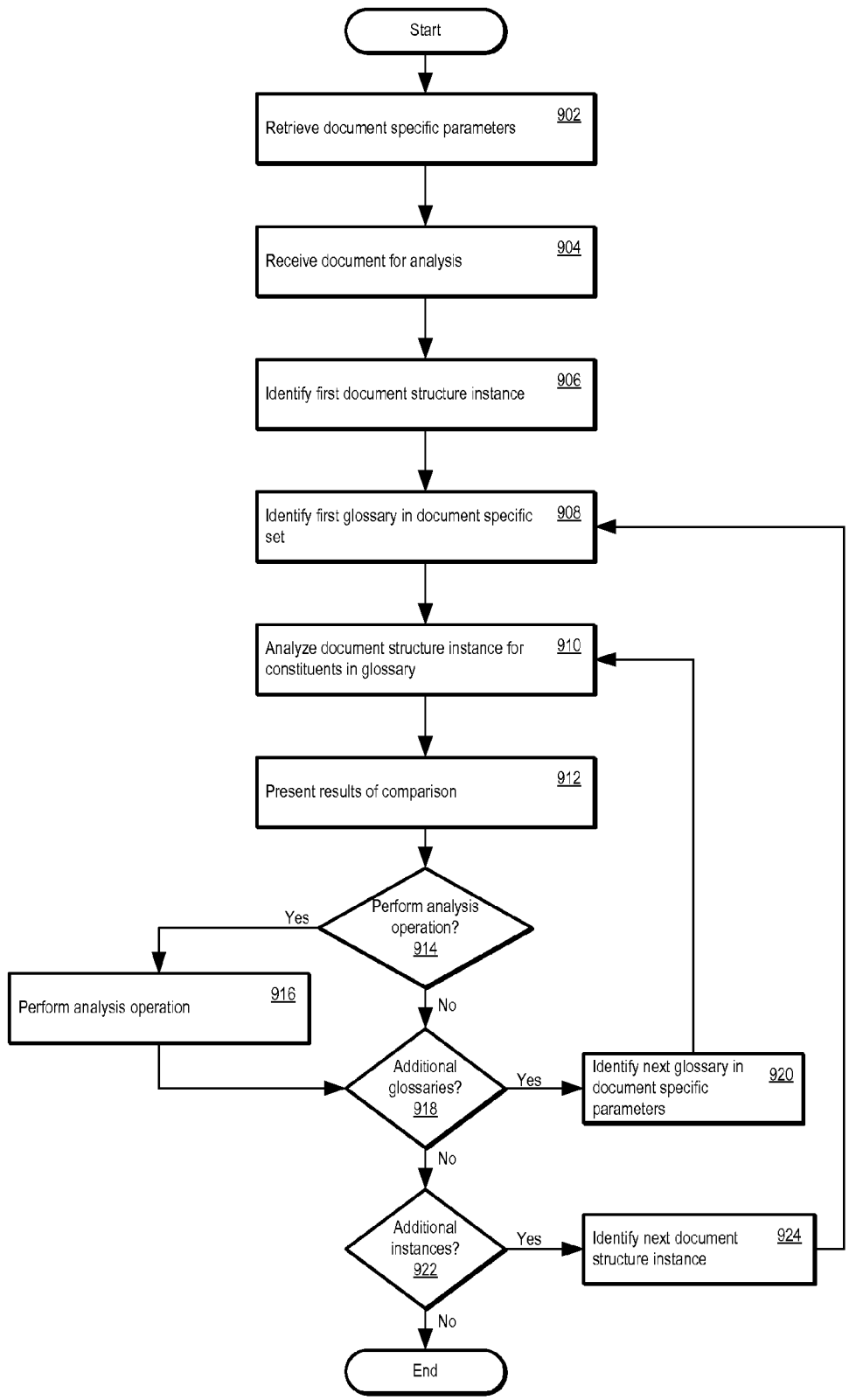
FIG. 9 shows logic flow for a requirements analysis system.

FIG. 9 shows logic flow for a requirements analysis system 702. The document analysis module 126 receives the document parameters, such as the glossaries 140-146 or the constituents of the glossaries 140-146, from the document parameter set 138 (902). The document analysis module 126 then receives the document for analysis (904). In starting the analysis of the document, the document analysis module identifies a first document structure instance, such as document structure instance 134 (906). The document analysis module 126 may not identify any document structure instances, in which case, the document analysis module 126 may display a graphical user interface with an analysis message indicating that the document analysis module 126 did not identify any document structure instances.

Where the document analysis module 126 identifies a document structure instance, the document analysis module 126 then identifies a first glossary in the document specific parameter set (908). The first glossary may be any of the glossaries 140-146. The first glossary may also be a glossary stored in the document analysis database 124. Alternatively, or in addition, the document analysis module 126 may receive a structure category component selection value that indicates the structure category component to start the analysis. For example, the document analysis module 126 may receive a structure category component selection value corresponding to the action category component, in which case, the document analysis module 126 begins the analysis of the document structure instance with the action glossary 142.

The document analysis module 126 then begins analyzing the document structure instance to determine whether the document structure instance contains any of the constituents in the first glossary (910). In one implementation, the document analysis module 126 compares each of the constituents of the first glossary with the document structure instance. After the analysis, the document analysis module 126 presents the results of the analysis, such as through the graphical user interface 712 (912).

Based on the results of the analysis, the document analysis module 126 may decide to perform a document analysis operation, pre-configured or otherwise, based on the results of the analysis (914). Examples of performing a document analysis operation include some of the examples previously mentioned above, but also include, displaying a graphical user interface, retrieving an analysis message, or terminating the analysis operation of the document structure instance. Where the document analysis module 126 decides to perform a document analysis operation (916), the document analysis module 126 may use the graphical user interface 712 to present an analysis message associated with the results of the analysis. For example, where the document analysis module 126 determines that the document structure instance does not have an action constituent from the action glossary 142, the document analysis module 126 uses the graphical user interface 712 to present an analysis message relating to the absence of the action constituent and a control parameter for adding an action constituent to the analyzed document structure instance. Alternatively, or in addition, the document analysis module 126 may be pre-configured to apply a change to the document structure analysis based on the results of the analysis and of the category component associated with the first glossary. The document analysis module 126 may perform more than one document analysis operation on the analyzed document structure instance.

The document analysis module 126 then determines whether the document parameter set contains additional glossaries (918), and if so, identifies the next glossary in the document parameter set with which to use in analyzing the document structure instance (920). When the document analysis 126 determines that there are no additional glossaries with which to use in analyzing the document structure instance, the document analysis module 126 then proceeds to determine whether there are additional document structure instances to identify (922). If so, the document analysis module 126 identifies another document structure instance (922), and proceeds through the analysis of the additional identified document structure instance as described above. After the document analysis module 126 determines that there are no additional document structure instances to analyze, the document analysis module 126 terminates its analysis of the received document.

Figure 10:
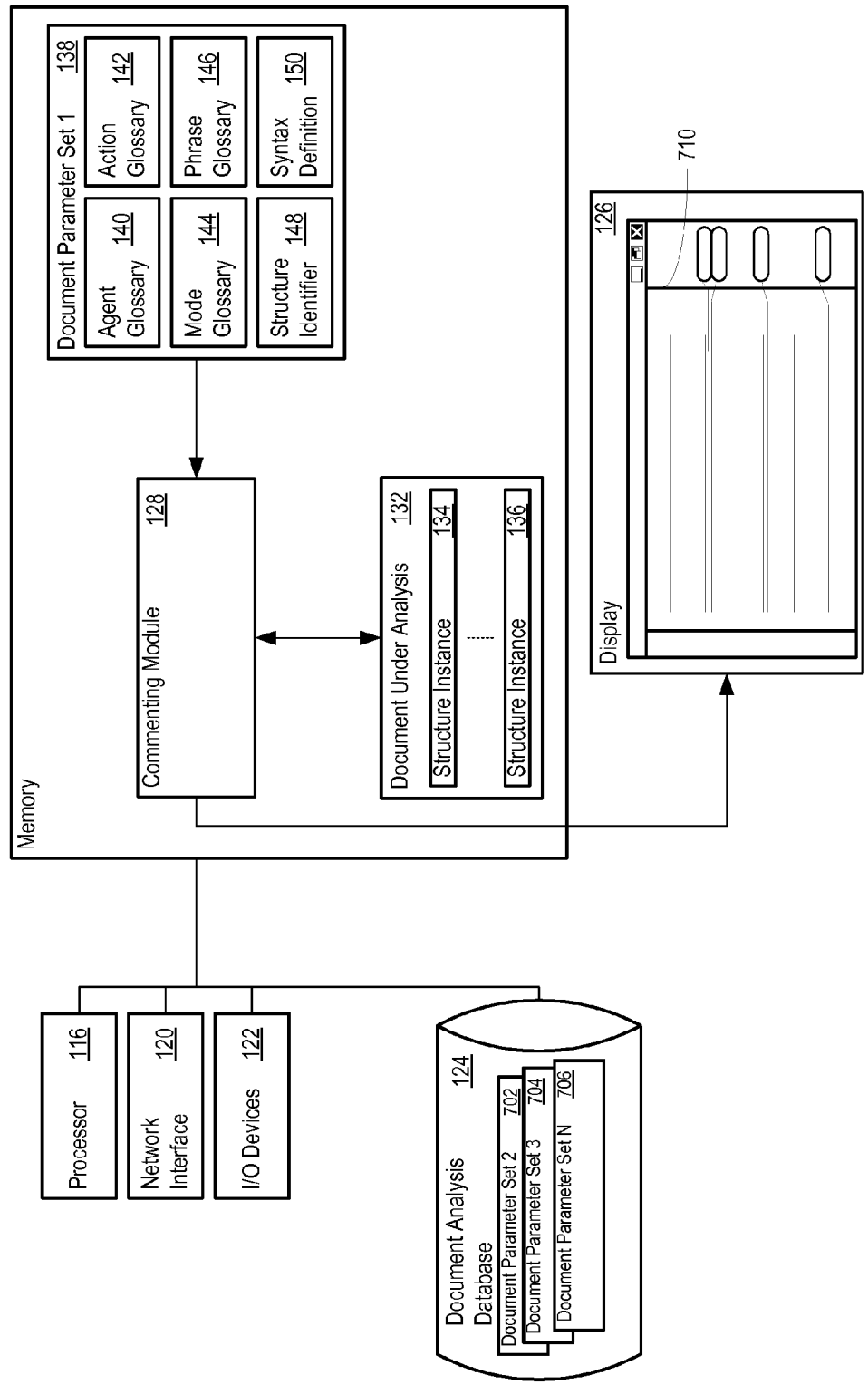
FIG. 10 shows a requirements commenting system.

FIG. 10 shows a requirements commenting system 1002. In the system shown in FIG. 10, the requirements commenting system 1002 includes components similar to those described with reference to FIG. 7 and the requirements analysis system 702. However, the requirements commenting system 1002 may further include the document commenting module 128.

In general, the document commenting module 128 is operative to comment on the document instances 134-136 of the document under analysis 132. For example, the document commenting module 128 may determine whether the document structure instance 134-136 includes any of the constituents in glossaries 140-146 consistent with the syntax definition 150. More specifically, the document commenting module 128 may determine whether a document structure instance 134, such as a requirements statement of a requirements document, includes a constituent from the agent glossary 140. In an alternative example, the document commenting module 128 may determine whether a document structure instance 134 includes a constituent from the phrase glossary 146, the mode glossary 144, the action glossary 142, or another glossary from another document parameter set 704-708.

The document commenting module 128 may further output an analysis message based on the analysis performed by the document commenting module 128. In one implementation, outputting an analysis message includes embedded an analysis message as a comment in the electronic representation 710 of the document under analysis 132. The pseudocode below illustrates one method performable by the document commenting module 128 in retrieving analysis messages and embedding the analysis messages as comments in the electronic representation 710 of the document under analysis 132:

```
ProcessRequirements (Document reqDoc)
    For each document structure instance s in reqDoc
        If (isRequirement(s) is true)
            If (findAgent (s) = true)
                Mark agent
            Else
                Output ("No Agent Found")
                return
            End if
            If (findMode (s) = true)
                Mark mode
```

-continued

```
            Else
                Output ("No Mode Found")
                return
            End if
            If (findAction (s) = true)
                Mark action
            Else
                Output ("No Action Found")
                return
            End if
            Mark rest of sentence
            If (findPhrase (s) = true)
                Mark phrase
                Output ("Phrase used in requirement")
            End if
        End if
    End For
End ProcessRequirements
```

The document commenting module 128 may further perform one or more of the analyses as described above with reference to the document analysis module 126.

Figure 11:
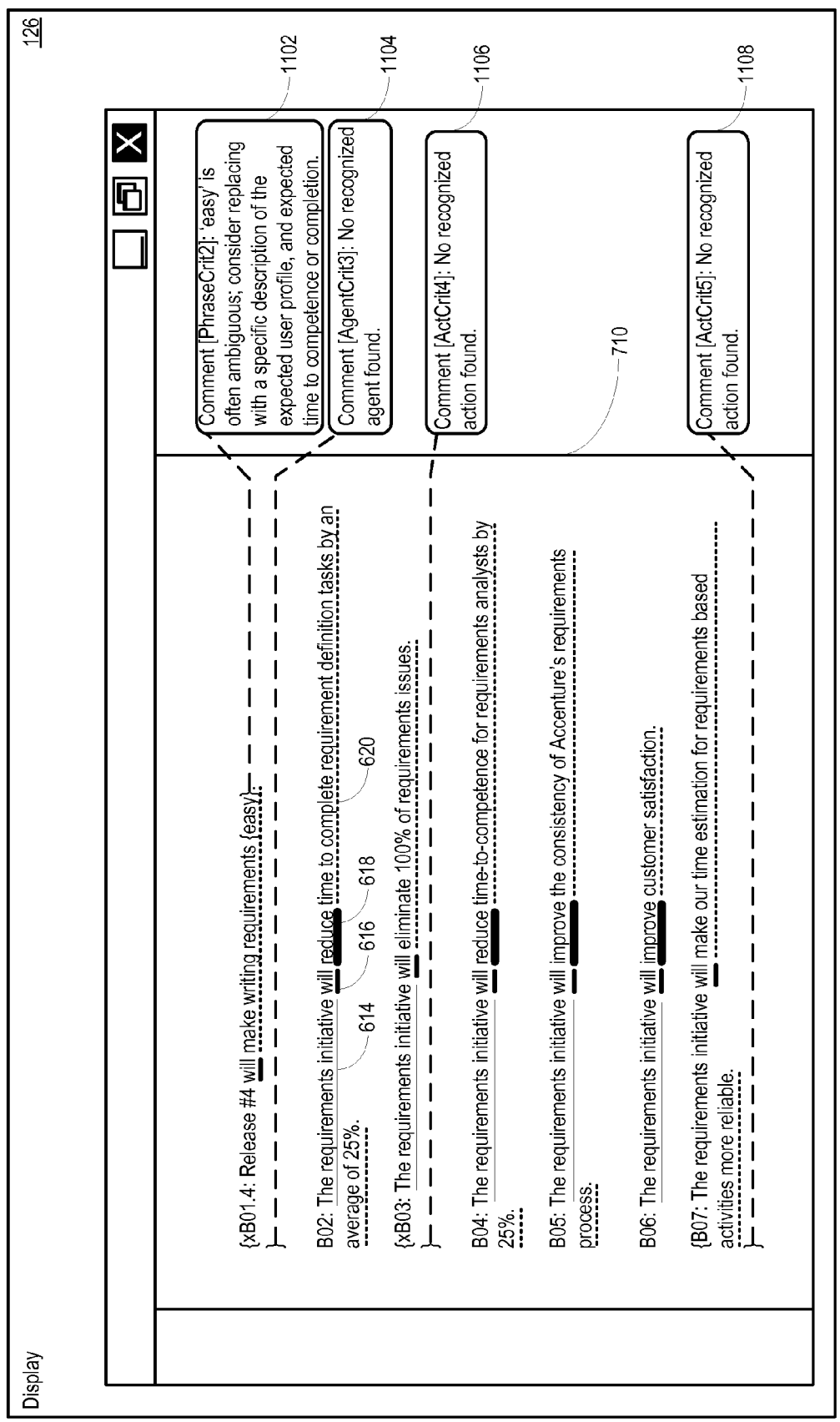
FIG. 11 shows an analysis messages embedded in a document under analysis.

FIG. 11 shows analysis messages embedded as comments 1102-1108 in an electronic representation 710 of a document under analysis 132. The embedded comments 1102-1108 include a phrase embedded comment 1102, an agent embedded comment 1104, and action embedded comments 1106-1108. Each of the embedded comments have analysis messages associated with a glossary 140, 142, and 146. For example, the phrase embedded comment 1102 has an analysis message associated with the phrase glossary 146, the agent embedded comment 1104 has an analysis message associated with the agent glossary 140, and the action embedded comments 1106-1108 have analysis messages associated with the action glossary 142. Moreover, the document commenting module 128 may identify a specific constituent through the embedded comments 1102-1108, such as identifying the constituent "easy" as shown in FIG. 11.

Furthermore, the document commenting module 128 may indicate in the electronic representation 710 the structure category component of the document instances of the document under analysis 132 with markings 614-620. Using the markings 614-620 as discussed above with reference to FIG. 6, the document commenting module 128 may use a thin line 614 for the agent, a medium line 616 for the modal verb, and a heavy line weight 618 for the action. The document commenting module 128 may further use a dashed line 620 for the remainder.

Figure 12:
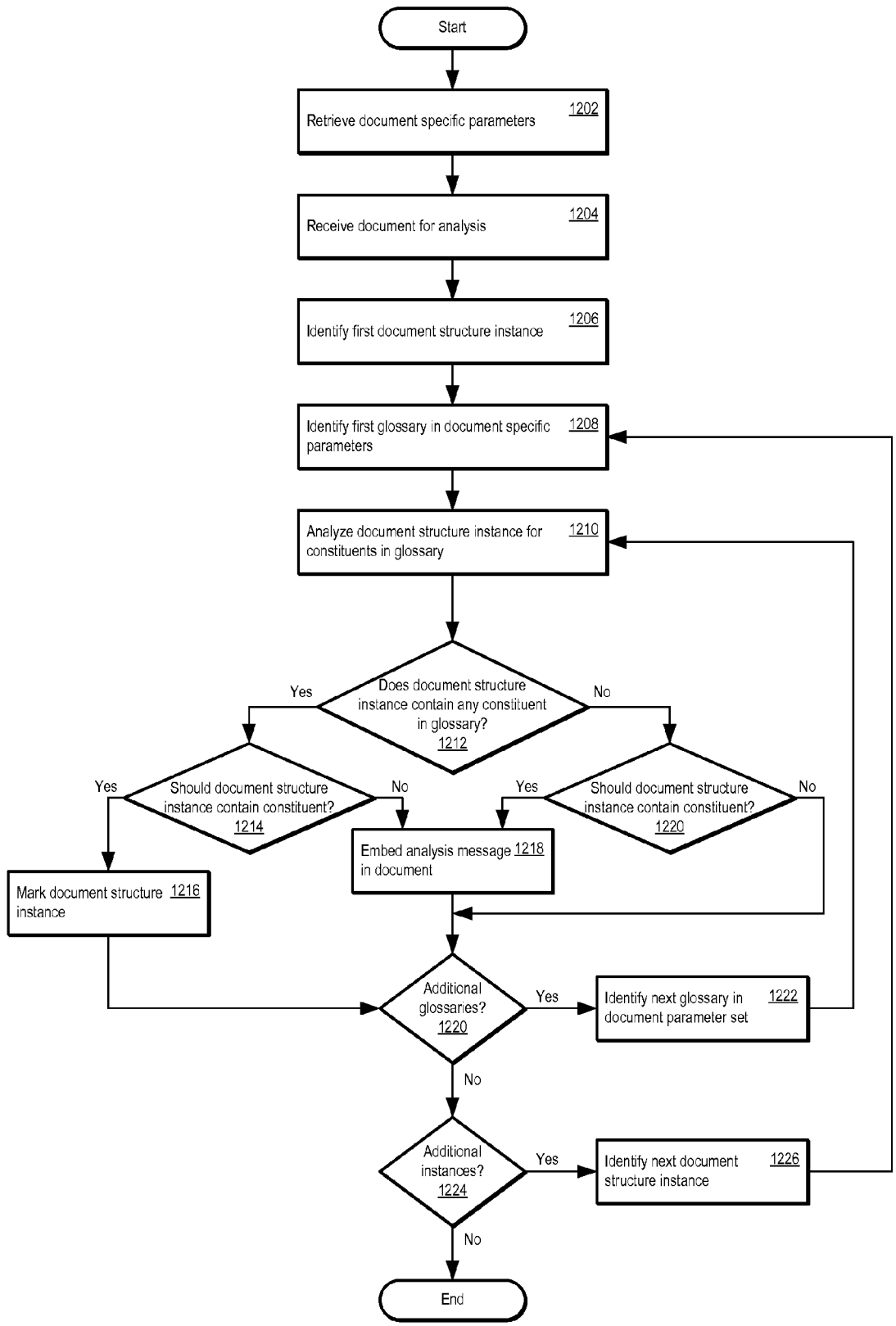
FIG. 12 shows logic flow for a requirements commenting system.

FIG. 12 shows logic flow for the requirements commenting system 1002. The document commenting module 128 receives the document parameters, such as the glossaries 140-146 or the constituents of the glossaries 140-146, from the document parameter set 138 (1202). The document commenting module 128 then receives the document for analysis (1204). In starting the analysis of the document, the document commenting module 128 identifies a first document structure instance, such as document structure instance 134 (1206). The document commenting module 128 may not identify any document structure instances, in which case, the document commenting module 128 may display an analysis message indicating that no document structure instances were identified.

Where the document commenting module 128 identifies a document structure instance, the document commenting module 128 then identifies a first glossary in the document specific parameter set (1008). The first glossary may be any of the glossaries 140-146. The first glossary may also be a glossary stored in the document analysis database 124. Alternatively, or in addition, the document commenting module 128 may receive a structure category component selection value that indicates the structure category component to start the analysis. For example, the document commenting module 128 may receive a structure category component selection value corresponding to the action category component, in which case, the document commenting module 128 begins the analysis of the document structure instance with the action glossary 142.

The document commenting module 128 then begins analyzing the document structure instance to determine whether the document structure instance contains any of the constituents in the first glossary (1210). In one implementation, the document commenting module 126 compares each of the constituents of the first glossary with the document structure instance (1212).

Where the document commenting module 128 determines that the document structure instance contains a constituent from the first glossary, the document commenting module 128 then proceeds to determine whether the document structure instance should contain the constituent (1214). If the document commenting module 128 determines that the document structure instance should contain the identified constituent, the documenting commenting module 128 indicates in the document structure instance the identified constituent (1216). For example, the syntax definition 150 defines that a requirement statement should contain an action category component. Accordingly, the document commenting module 128 will mark a document structure instance where the document commenting module 128 finds an action constituent in the document structure instance.

However, If the document commenting module 128 determines that the document structure instance should not contain the identified constituent, the documenting commenting module 128 retrieves an analysis message from the document parameter set 138 and embeds the analysis message in the electronic representation 710 of the document under analysis 132 (1218). For example, the phrase glossary 146 contains constituents that should not appear in a document structure instance. In this example, where the document commenting module 128 identifies a constituent from the phrase glossary 146 in the document structure instance, the document commenting module 128 embeds an analysis message associated with the identified constituent.

Alternatively, the document commenting module 128 may determine that the document structure instance does not contain a constituent from the first glossary. In this case, the document commenting module 128 determines whether the document instance structure should contain a constituent from the glossary. If the document structure instance should contain a constituent from the glossary, the document commenting module 128 retrieves an analysis message associated with the missing constituent or glossary, and embeds the analysis message in the electronic representation 710 of the document under analysis 132 (1218). Alternatively, if the document structure instance should not contain a constituent from the glossary, the document commenting module 128 then proceeds to determine whether there are additional glossaries (1220) in the document parameter set 138.

As an example of the above described logic flow, the syntax definition 150 defines that a requirements statement should contain an action category component. Where the document commenting module 128 identifies a requirements statement, but further identifies that the requirements statement is missing an action category component, the document commenting module 128 embeds an analysis message in the electronic representation 710 of the document under analysis 132 indicating that the requirements statement is missing an action category component.

After marking the document structure instance (1216), embedding an analysis message (1218), or determining that the document structure instance should not contain a constituent from the first glossary (1220), the document commenting module 128 proceeds to determine whether there are additional glossaries in the document parameter set 138 (1220). If the document commenting module 128 determines that there are additional glossaries, the document commenting module 128 identifies the next glossary (1222) and proceeds to analyze the document structure instance using the identified glossary (1210). However, if the document commenting module 128 determines that there are no remaining glossaries to use in analyzing the identified document structure instance, the document commenting module 128 proceeds to determine whether there are additional document structure instances remaining in the document under analysis 132 (1224). If there are remaining document structure instances, the document commenting module 128 identifies the next document structure instance (1226) and proceeds to analyze the identified next document structure instance as described above. Where there are no remaining document structure instances and no remaining glossaries, the document commenting module 128 terminates its analysis and commenting.

Although the logic flow described above illustrates some of the actions of the document commenting module 128, the actions described are not exhaustive. For example, the document commenting module 128 may mark a remainder component of the document structure instances.

Figure 13:
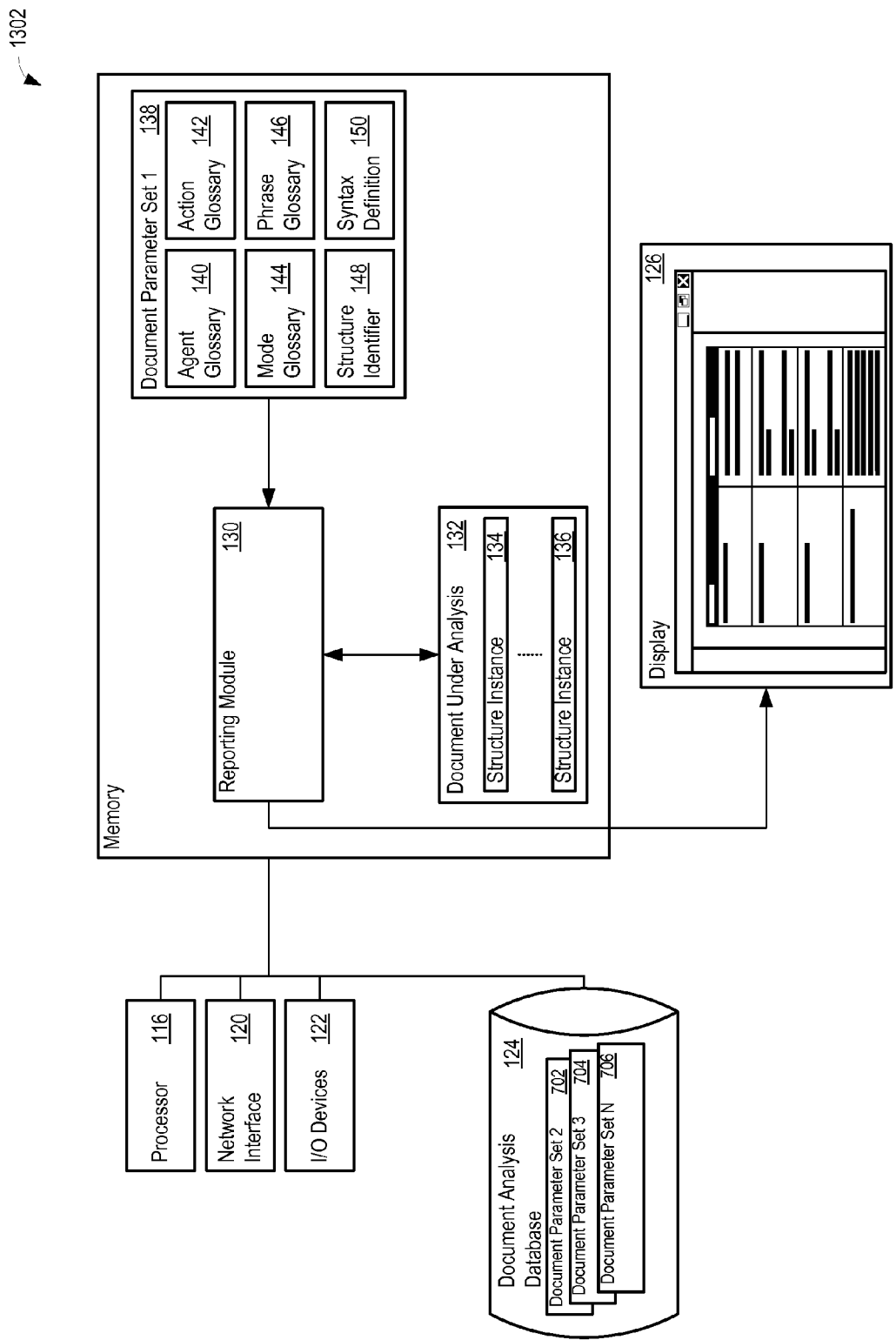
FIG. 13 shows a report generator system.

FIG. 13 shows a report generator system 1302. In the system shown in FIG. 13, the report generator system 1002 includes components similar to those described with reference to FIG. 7 and the requirements analysis system 702. However, the report generator system 1302 may further include the document reporting module 130. The document reporting module 130 may be configured to analyze electronic documents and document structure instances as described above with reference to the document analysis module 126.

In general, the document reporting module 130 is operative to generate reports organized by constituent and document structure instance document reporting module 130. More specifically, the document reporting module 130 is operative to generate a report associating constituents with document structure instances that contain those constituents and are consistent with the syntax definition 150. In general, the document reporting module 130 is operative to receive a structure category component value and generate a report using the received structure category component value.

FIG. 14 shows an example report 1402 generated by the document reporting module 130 using an action category component value. The example report 1402 contains a constituent column 1404 and an identified requirements statement column 1406. In the example report 1402, the constituent column 1404 contains rows of agent constituents and the requirements statement column 1406 contains rows of requirement statements associated with the agent constituent identified in the constituent column 1404. However, the constituent column 1404 may include other constituents such as action constituents, mode constituents, or other constituents, depending on the structure category component value received by the document reporting module 130. The document reporting module 130 may also be pre-configured to generate a report using a specific document structure category component.

Figure 15:
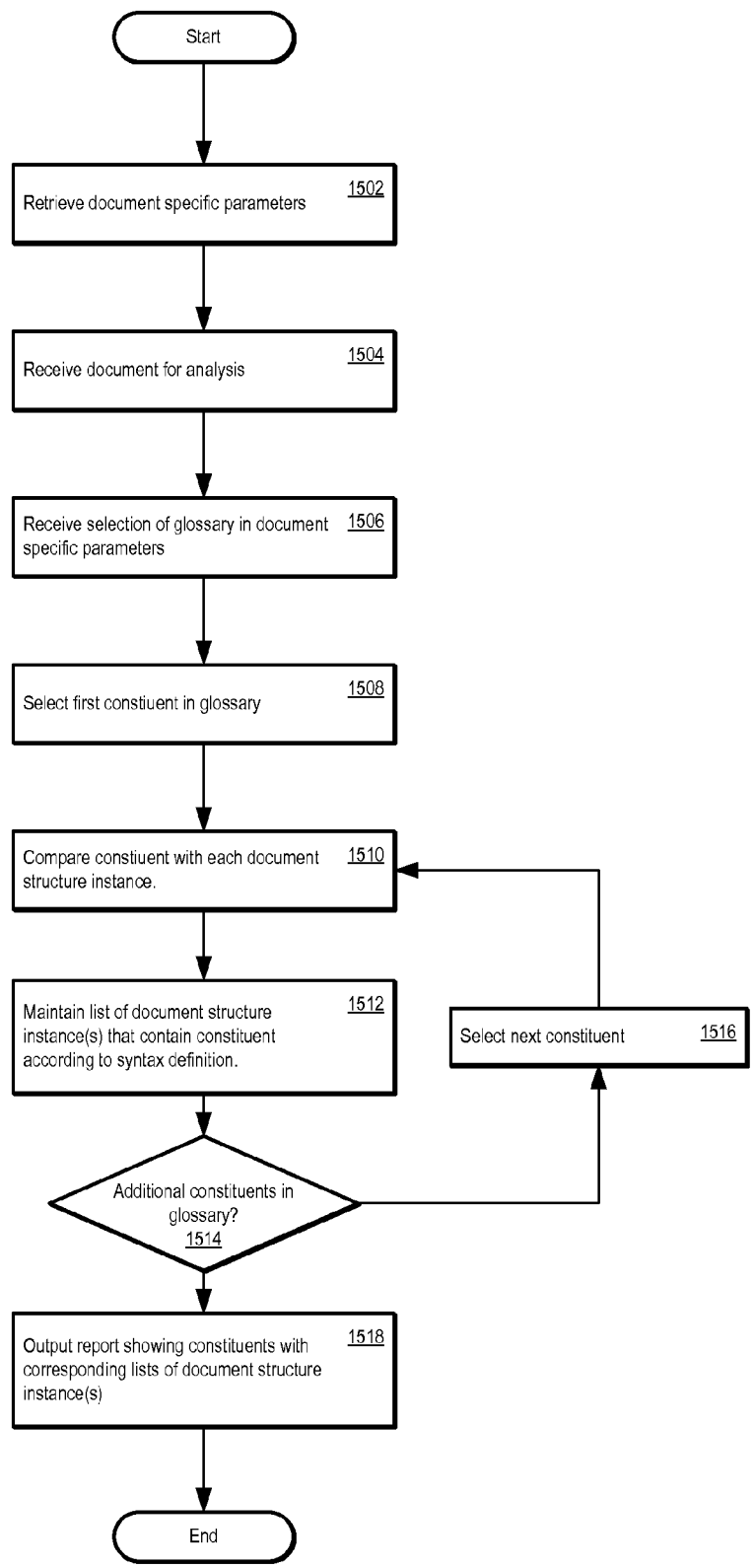
FIG. 15 shows logic flow for a report generator system.

FIG. 15 shows logic flow for the report generator system 1302. The document reporting module 130 receives the document parameters, such as the glossaries 140-146 or the constituents of the glossaries 140-146, from the document parameter set 138 (1502). The document reporting module 130 then receives the document for analysis (1504). Afterwards, the document reporting module 130 receives a structure category component selection value for selecting a glossary by which to analyze the received document. (1506)

In starting the report of the received document, the document reporting module 130 selects a first constituent from the selected glossary (1508). The document reporting module 130 then compares the selected first constituent with the document structure instances of the received document (1510). As the document reporting module 130 is comparing the selected first constituent with the document structure instances, the document reporting module 130 maintains a list of document structure instances that contain the selected first constituent according to the syntax definition 150. It is possible that none of the document structure instances contain the selected first constituent or contain the selected first constituent consistent with the syntax definition 150.

After comparing the selected first constituent with the document structure instances, the document reporting module 130 then determines whether there are additional constituents in the selected glossary (1514). Where the document reporting module 130 determines there are additional constituents in the selected glossary, the document reporting module 130 selects the next constituent in the selected glossary (1516), and proceeds to compare the selected next constituent with the document structure instances in the received document (1510). The document reporting module 1530 also maintains a list of document structure instances that contain the selected next constituent consistent with the syntax definition 150.

Where the document reporting module 130 determines that the selected glossary does not contain additional constituents, the document reporting module 130 outputs a report containing the list of constituents from the selected glossary and the maintained lists of document structure instances containing the constituents consistent with the syntax definition 150 (1518). In some instances, a list associated with a constituent may be an empty list. The document reporting module 130 may output more than one report depending on the number of selected glossaries and the number of received documents.

Figure 16:
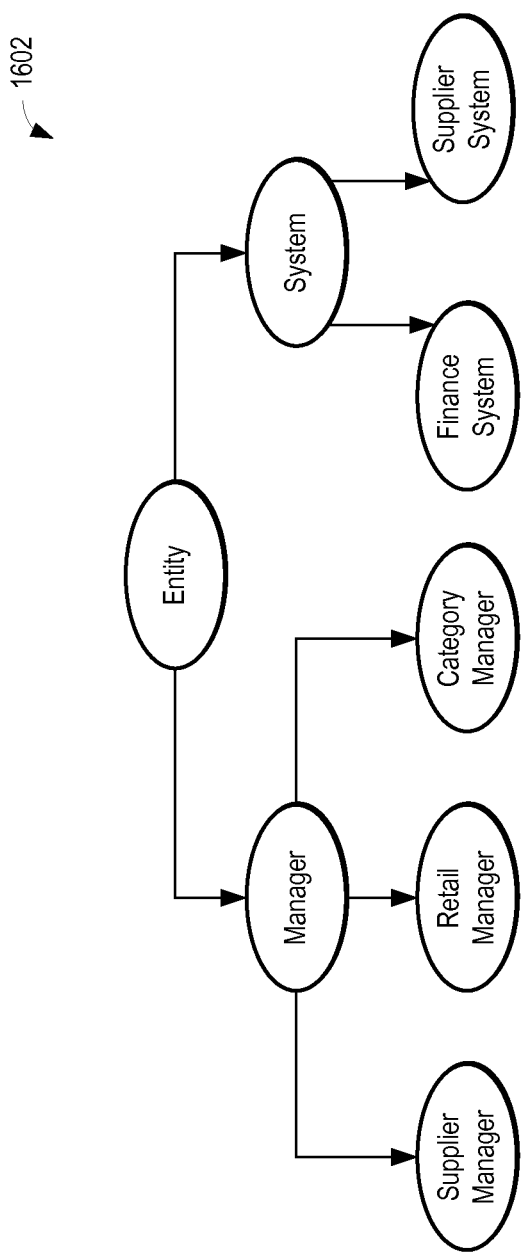
FIG. 16 shows an example of an agent taxonomy.
Figure 17:
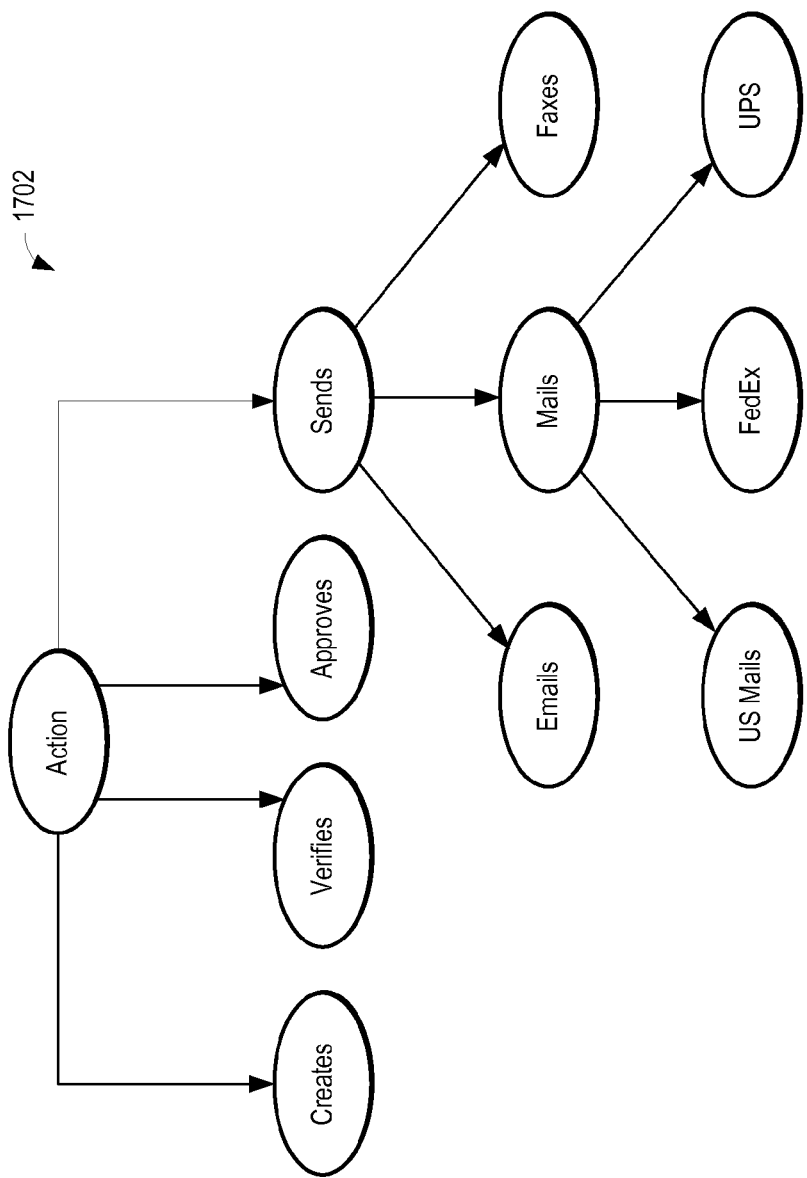
FIG. 17 shows an example of an action taxonomy.

FIG. 16 shows an example of an agent taxonomy 1602. The agent taxonomy 1602 illustrates a hierarchical relationship between agent constituents contained in an agent glossary 140. For example, the agent taxonomy 1602 illustrates that a "supplier manager" is a type of "Manager." Similarly, FIG. 17 shows an example of an action taxonomy 1702. The action taxonomy 1702 illustrates a hierarchical relationship between action constituents contained in an action glossary 142. For example, the action taxonomy 1702 shows that the verb "email" is a more specific verb for "Send." The agent taxonomy 1602 or the action taxonomy 1702 may be used as part of a domain knowledge based analysis to determine whether there is a conflict among document structure instances, or, more specifically, requirements statements. For example, the document analysis, commenting, and reporting system 102 may include one or more business rules for resolving conflicts between requirement statements using an agent glossary 140 configured with the agent taxonomy 1602, the action glossary 142 configured with the action taxonomy 1702, or other glossary configured with another type of taxonomy. The document analysis, commenting, and reporting system 102 may also be configured to identify similar document structure instances, such as "The purchasing system sends the order to the user" and "The purchasing system faxes the order to the user," using the agent taxonomy 1602, the action taxonomy 1702, or an additional or alternative taxonomy.

Figure 18:
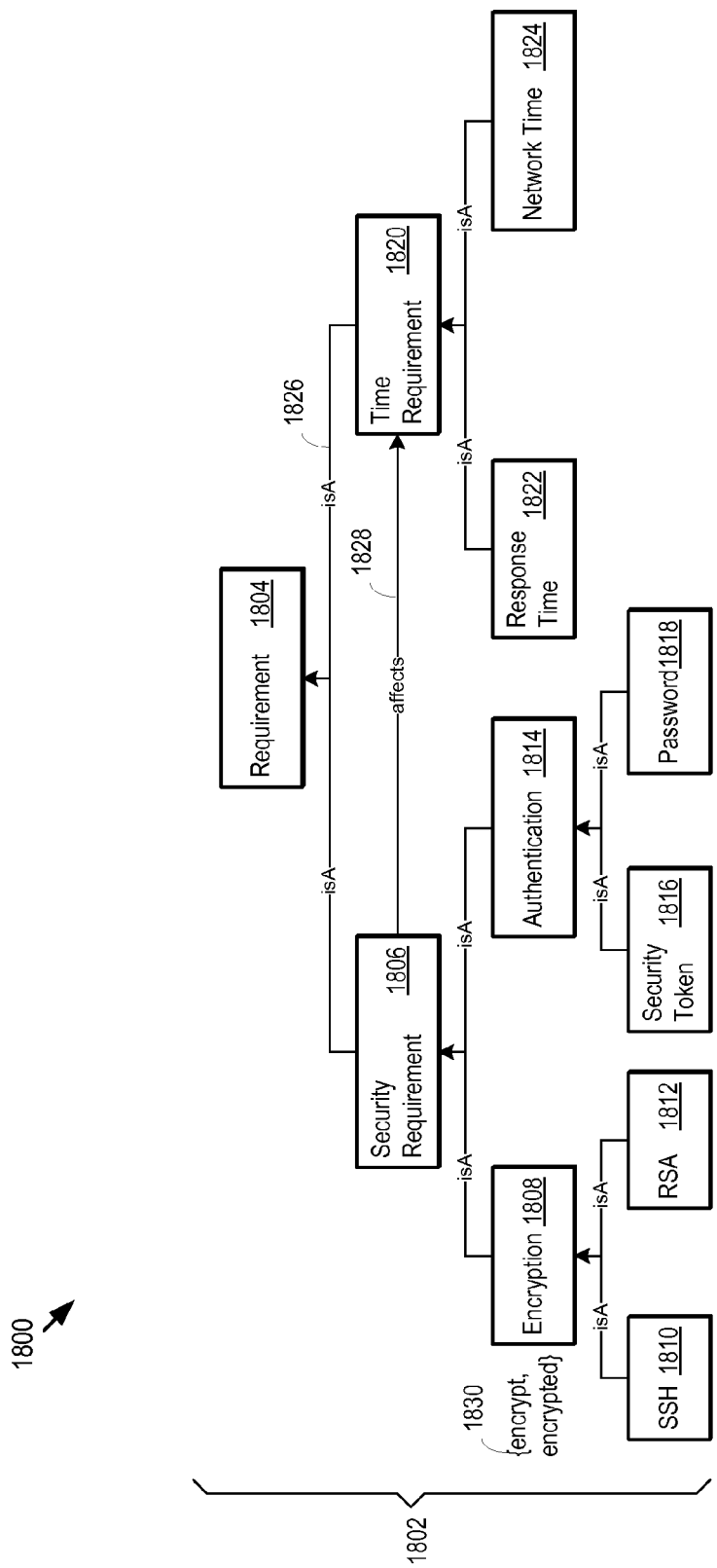
FIG. 18 shows an example of an ontology model.

FIG. 18 shows an example of an ontology model 1800. In one implementation, the ontology model 1800 defines an ontology hierarchy 1802. The ontology model 1800 may be described using the OWL Web Ontology Language. However, the ontology model 1800 may also be described using other languages such as the Resource Description Framework (RDF) or the Knowledge Interchange Format (KIF).

The ontology hierarchy 1802 comprises document structure instance classes related as root classes and child classes. For example, FIG. 18 shows that the ontology hierarchy 1802 starts with a root requirement class 1804 and that the root requirement class 1804 has two child classes, a security requirement class 1806 and a time requirement class 1820. In addition, the security requirement class 1806 is a root class of two child classes, an encryption class 1808 and an authentication class 1814. Similarly, the time requirement class 1820 is a root class of two child classes, a response time class 1822 and a network time class 1824 Additional child classes include an SSH class 1810, an RSA class 1812, a security token class 1816, and a password class 1818. As shown in FIG. 18, the SSH class 1810 and the RSA class 1812 are child classes of the encryption class 1808, and the security token class 1816 and the password 1818 are child classes of the authentication class 1814.

FIG. 18 also shows that the ontology hierarchy 1802 defines class relationships between the root classes and their associated child classes. For example, FIG. 18 shows that the ontology model 1800 includes a horizontal class definition relationship 1828 and a vertical class definition relationship 1826. In general, horizontal class definition relationships define relationships between classes unrelated to hierarchy, and vertical class definition relationships define hierarchical relationships between classes. In the example shown in FIG. 18, the horizontal class definition relationship 1828 is an "affects" relationship, and shows that the security requirement class 1806 affects the time requirement class 1820. In addition, FIG. 18 shows that the vertical class definition relationship 1826 is an "is A" relationship that shows that the time requirement class 1820 is a child class of the requirement class 1804. Examples of class definition relationships are shown below in Table 3.

TABLE 3

| Relationship Type | Description |
| --- | --- |
| Affect | Classifications that affect each other. |
| Contradict | Classifications that contradict each other |
| Dependency | Classifications that depend on each other |
| Implement | Classification that implements a higher-level classification |
| Similarity | Classifications that are similar to each other |
| isA | Classifications that are special cases of other classifications |

FIG. 18 also shows that the ontology model 1800 may further include instance class search terms that facilitate analysis of document structure instances against the ontology model 1800. Examples of instance class search terms are the encryption class search terms 1830 "encrypt" and "encrypted." Instance class search terms may be used to associate document structure instances with a class. Other examples of instance class search terms may be "SSH," "RSA," "authenticate," "password," or any other search term associated with the classes included in the ontology model

1800. However, other properties may be used to associate a document structure instance with one or more classes.

Figure 19:
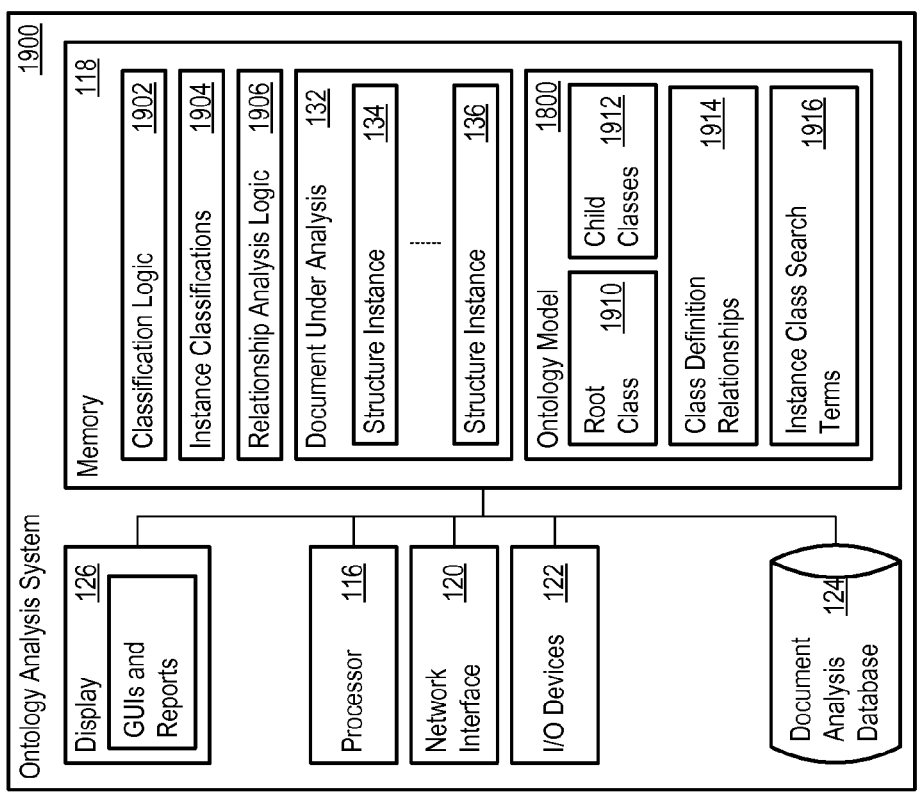
FIG. 19 shows an ontology analysis system.

Turning next to FIG. 19 is an example of an ontology analysis system 1900. The ontology analysis system 1900 may include one or more components of the document analysis, commenting, and reporting system 102. In one implementation, the memory 118 stores classification logic 1902 and relationship analysis logic 1906 for analyzing a document under analysis 132 using the ontology model 1800. The document analysis database 124 may also include additional ontology models other than ontology model 1800.

As shown in FIG. 19, the ontology model 1800 includes a root class 1910, such as the requirement class 1804, and child classes 1912, such as the security requirement class 1806 and the time requirement class 1820. The ontology model also includes class definition relationships 1914, such as horizontal relationship 1828 and vertical relationships 1826, and includes instance class search terms, such as the encryption instance class search terms 1830.

The classification logic 1902 is operative to analyze document structure instances 134-136 against the ontology model 1800 to determine classifications for the document structure instances among the document structure instance classes. In one implementation, the classification logic 1902 examines each of the structure instances 134-136 in a document under analysis 132, and when a document structure instance includes a search term associated with a class in the ontology model 1800, the classification logic 1902 assigns an instance classification to the document structure instance based on the found search term and the class associated with the found search term. However, the classification logic 1902 may assign an instance classification to a document structure using another property of the document structure instance other than search term.

In addition, the classification logic 1902 may communicate with the inference engine 106 to use a knowledge model to determine that the document structure instance is an instance of a class associated with the found search term. In one implementation, the inference engine 106 is a Jena inference engine, available from the Hewlett-Packard Development Company, LP located in Palo Alto, Calif. However, the inference engine 106 may be other reasoning engines such as Jess, available from the Sandia National Laboratories located in Livermore, Calif. or Oracle 10G, available from the Oracle Corporation located in Redwood Shores, Calif. The pseudo-code below illustrates one implementation of the classification logic 1902 when the classification logic 1902 uses the encryption instance class search terms 1830:

```
CreateRequirementInstance (Requirement R, Ontology ont, Model m)
    For each class_i in Ontology ont
        If class_i or searchterms (class_i) occur in R
            m.assert (R is a instance of classi)
        end if
    end For
end CreatementInstance
```
where: searchterms (class_i) is list of search terms for an class in an ontology, such as "{encrypt, encrypted}."

As one example of the classification logic 1902 in operation, suppose that a first document structure instance states that "The messaging system will encrypt all its responses using SSH" and a second document structure instance states that "The messaging system will have a response time of 5 milliseconds." In this example, the classification logic 1902 will assert the first document structure instance as an instance of the encryption class 1808 and the SSH class 1810. The classification logic 1902 will also assert the second document structure instance as an instance of the response time class 1822. The classification logic 1902 may further maintain these assertions as part of the instance classifications 1904.

In addition to the classification logic 1902, the relationship analysis logic 1906 is operative to whether the document structure instances 134-136 affect each other. The relationship analysis logic 1906 may also operate in conjunction with the classification logic 1902 to determine the document structure instances 134-136 that affect each other. The relationship analysis logic 1906 may further use a knowledge model for determining the document structure instances 134-136 that affect each other. The relationship analysis logic 1906 may also find related document structure instances, complimentary document structure instances, or other document structure instances. The pseudo-code below illustrates one example of the relationship analysis logic 1906:

```
FindAffectedRequirements(Document d, Ontology ont, Model m)
    m.loadOntology (ont)
    For each Requirement r in a document
        CreateRequirementInstance (R, ont, m)
    End For
    m.executeQuery(SELECT  ?R1,  ?R2  WHERE  {?R1  RDF.Type
            Requirement  ?R2  RDF.Type  Requirement  .?R1
            affects  ?R2})
End FindAffectedRequirements
```
where: the m.executeQuery is a SPARQL query that returns any two instances of class Requirement (R1 and R2) that affect each other.

As shown above, the relationship analysis logic 1906 uses the SPARQL query language. However, the relationship analysis logic 1906 may use other query languages, such as SQL, the JESS Rules language, LISP, or any other query language.

Figure 20:
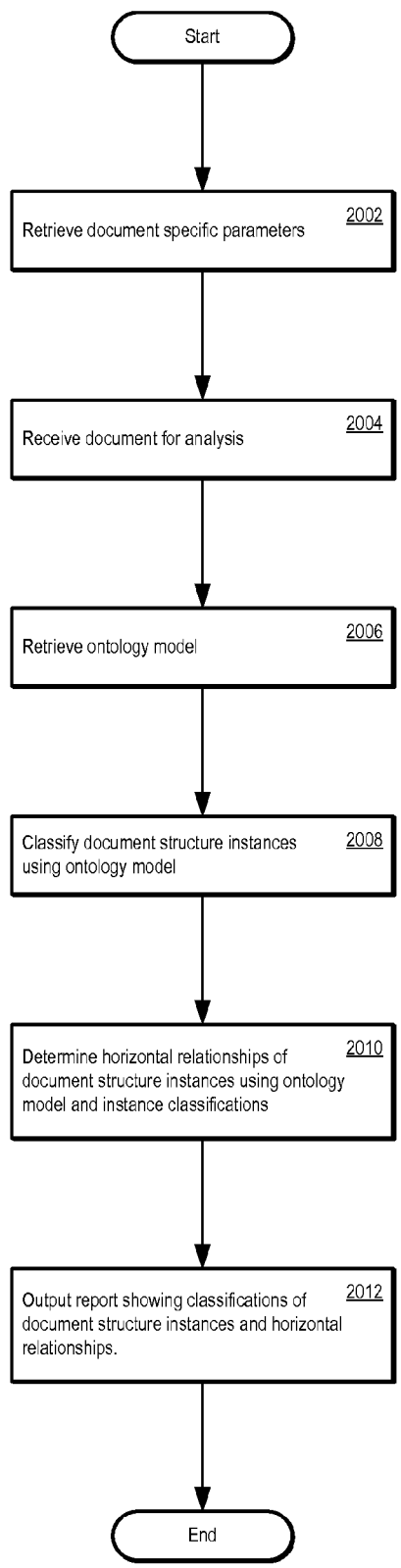
FIG. 20 shows logic flow for an ontology analysis system.

FIG. 20 shows logic flow for an ontology analysis system 1900. The ontology analysis system 1900 initially retrieves one or more document parameter sets from the document analysis database 124 (2002). As previously discussed, a document parameter set may include one or more glossaries, structure identifies, syntax definitions, or other parameters. The ontology analysis system 1900 then receives the document under analysis 132 (2004). Thereafter, the ontology analysis system 1900 retrieves an ontology model 1800 (2006). The ontology analysis system 1900 may also retrieve additional ontology models from the document analysis database 124.

Using the retrieved ontology model and the classification logic 1902, the ontology analysis system 1900 classifies the document structure instances of the document under analysis 132 based on whether the document structure instances contain associated instance class search terms 1916 (2008). For example, the classification logic 1902 may be operable to operable to search for instance class search terms 1916 in one or more document structure instances. The ontology analysis system 1900 may also maintain a set of instance classifications 1904 that may be identifiers or other data that assign one or more classes to a document structure instance.

After classifying the document structure instances, the ontology analysis system 1900 may then use the relationship analysis logic 1906 to determine whether there are horizontal class definition relationships between the document structure instances using the instance classifications 1904 and the ontology model 1800 (2010). The ontology analysis system 1900 may also communicate with an inference engine 106 to classify the document structure instances or to analyze the class definition relationships between the document structure instances.

Following the classification (2008) and relationship analysis (2010) of the document structure instances, the ontology analysis system 1900 may output an analysis result showing the results of the classification and relationship analysis (2012). As one example of an analysis result, the ontology analysis system 1900 may insert a relationship notification message into the document the document under analysis 132. Additional types of analysis results are also possible.

The description above explained the role of several types of glossaries 140-146, such as the agent glossary 140 that defines permissible agents. In addition to the glossaries 140-146, the document analysis, commenting, and reporting system 102 may also include other types of glossaries, such as a requirements relationship glossary. FIG. 21 shows one example of a requirements relationship glossary 2102. The requirements relationship glossary 2102 may define relationships between classes of an ontology model. The requirements relationship glossary 2102 may also define relationships between the structure category components of a document structure instance.

In one implementation, the requirements relationship glossary 2102 includes a class category 2104, a parent class category 2106, a keywords category 2108, and a relationship category 2110. Other implementations of the requirements relationship glossary 2102 may include other categories. The class category 2104 may identify a class from an ontology model. The parent class category 2106 may identify a parent class for a given class from the class category 2104. The keywords category 2108 may include keywords that facilitate analysis of document structure instances. Examples of keywords associated with an authentication class may include "password," "token," "authentication," and "Kerberos." The keywords may be used to associate document structure instances with a class. Alternatively, or in addition, the keywords may be used to associate a structure category component with a class. The relationship category 2110 may identify whether the given class has a relationship with another class. For example, a security class structure category component may affect a time structure category component.

Figure 22:
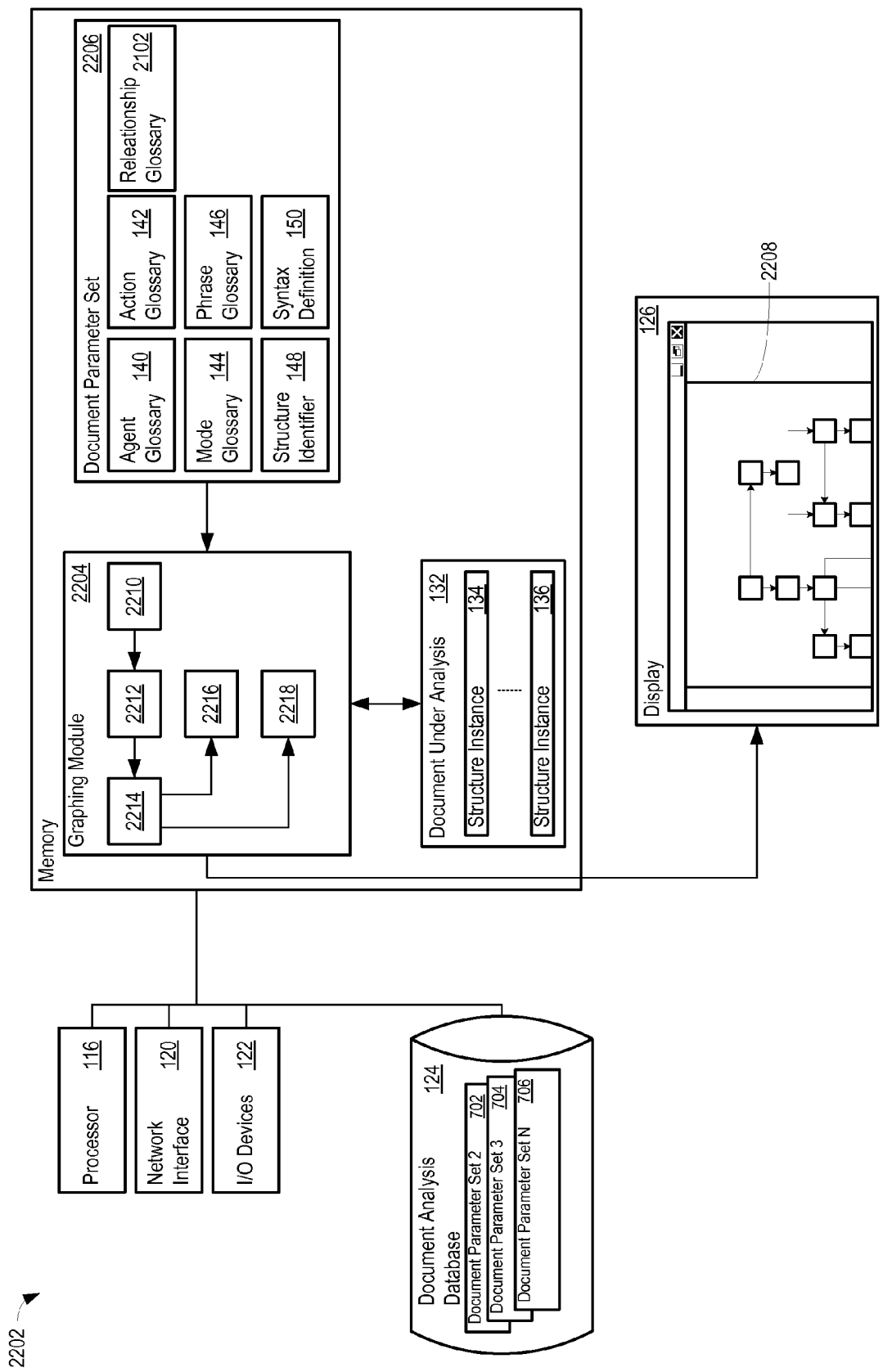
FIG. 22 shows a requirements graphing system.

FIG. 22 is an example of a requirements graphing system 2202. In the example shown in FIG. 22, the requirements graphing system 2202 includes a graphing module 2204 in communication with a document under analysis 132 and a document specific parameter set 2206. The graphing module 2204 may also be in communication with the document analysis database 124 to retrieve one or more document specific parameter sets 706-708. In one implementation, the graphing module 2204 is in communication with the document parameter set 2206 that includes the agent glossary 140, the mode glossary 144, the structure identifiers 148, the action glossary 142, the phrase glossary 146, the syntax definitions 150, and the relationship glossary 2102. The graphing module 2204 may also be in communication with the processor 116, the network interface 120 and various other input/output devices 122. As shown in FIG. 22, the graphing module 2204 is in communication with the display 126, which may display an electronic representation 2208 of an ontology hierarchy for the document under analysis 132.

Although the graphing module 2204 is shown as integrated as part of the requirements graphing system 2202, the graphing module 2204 may be integrated as part of any other system. For example, the graphing module 2204 may be incorporated into the document analysis, commenting, and reporting system 102, the requirements analysis system 702, the requirements commenting system 1002, the report generator system 1302, or the ontology analysis system 1900. In other implementations, the graphing module 2204 is accessed through remote procedure calls, web services, or other interfaces to obtain an image to render on the display 126.

The graphing module 2204 includes logic that generates or modifies an ontology hierarchy using the document parameter set 2206 and the document instances 134-136 of the document under analysis 132. For example, the graphing module 2204 may first identify a document structure instance in the document under analysis 132 (2210). The graphing module 2204 may then select or identify a structure category component from the identified document structure instance, such as an agent action or other structure category component (2212). Thereafter, the graphing module 2204 may generate an ontology hierarchy that includes the identified structure category component (2214). In one implementation, the graphing module 2204 is operative to generate an ontology hierarchy that includes each of the structure category components from an identified document structure instance (2216). In another implementation, the graphing module 2204 is operative to generate an ontology hierarchy that includes each of the structure category components from each of the document structure instances 134-136 from the document under analysis 132 (2218).

In a further implementation, the graphing module 2204 generates a core ontology hierarchy that has common root classes, child classes, and relationships. The graphing module 2204 may be configured to use the core ontology hierarchy to generate a document specific ontology hierarchy. For example, the graphing module 2204 may access the various glossaries, such as the agent glossary 140 and the action glossary 142, to modify the core ontology hierarchy to include agent and action classes and instances specific to agent glossary 140 and the action glossary 142. The graphing module 2204 may then access relationship glossary 2102 to build types and establish relationships between the classes of the modified core ontology hierarchy. Thereafter, the graphing module 2204 may extract the structure category components from the document structure instances 134-136 to add instances or identifiers of the document structure instances to the modified core ontology hierarchy. In other implementations, the graphing module 2204 may be configured to communicate with other modules, such as the analysis module 126, to add instances or identifiers of the document structure instances 134-136 to the modified core ontology hierarchy. The modified core ontology hierarchy may then be assigned as the document specific ontology hierarchy.

The graphing module 2204 may display one or more ontology hierarchies as output 2208 on the display 126. For example, the graphing module 2204 may display the core ontology hierarchy, the document specific ontology hierarchy, or any other hierarchy. The hierarchies may be displayed at any time including while being generated by the graphing module 2204, after being generated by the graphing module 2204, or being retrieved from another source, such as a memory device or other computer system.

Figure 23:
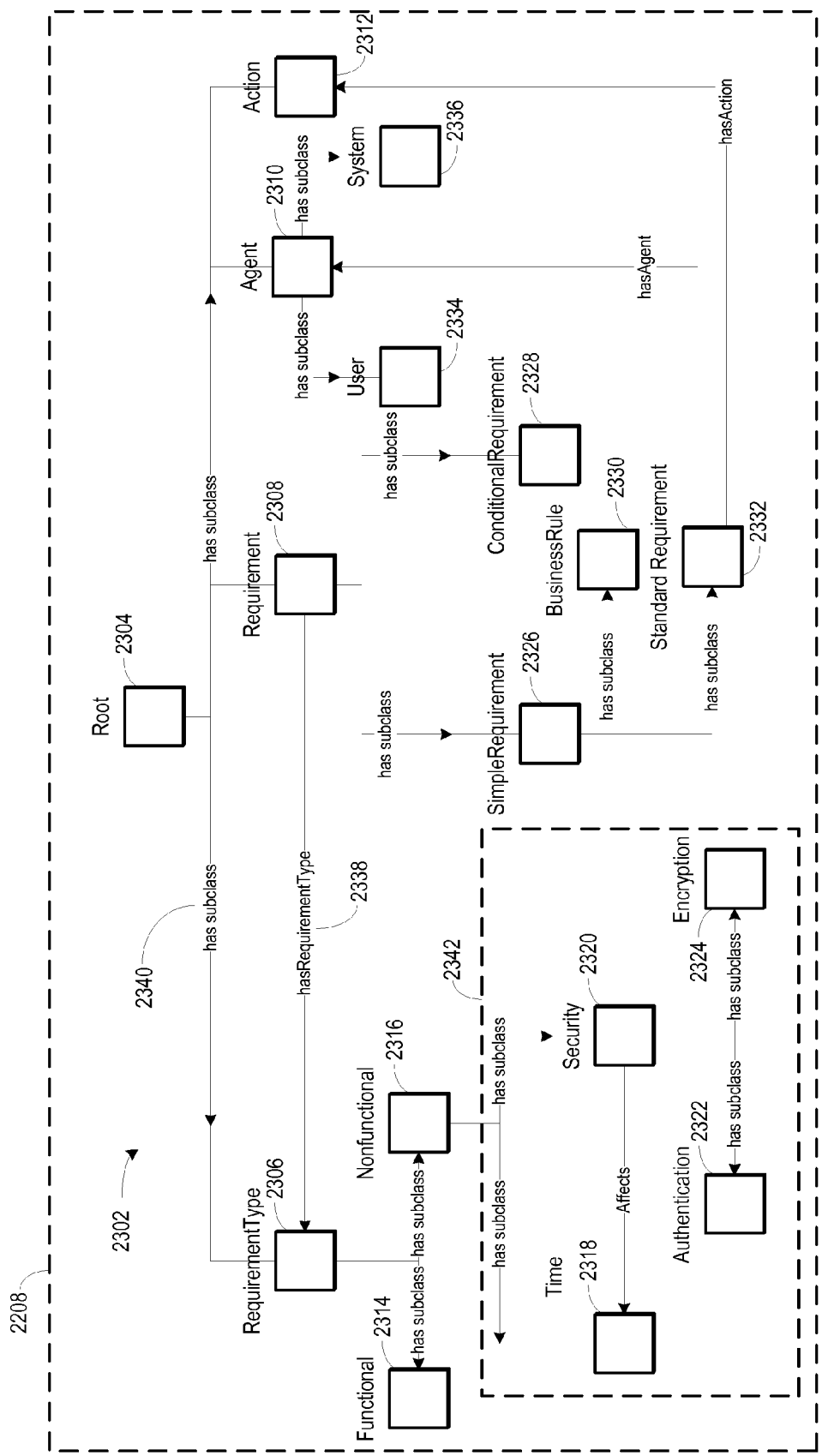
FIG. 23 shows an example of a core ontology hierarchy.

FIG. 23 shows one example of a core ontology hierarchy 2302. The core ontology hierarchy 2302 may be preconfigured or generated by the graphing module 2304. In one implementation, the core ontology hierarchy 2302 is generated as the output 2208. In general, the core ontology hierarchy 2302 illustrates the various relationships between classes of requirements. The core ontology hierarchy 2302 may be described using the OWL Web Ontology Language. However, the core ontology hierarchy 2302 may also be described using other languages such as the Resource Description Framework (RDF) or the Knowledge Interchange Format (KIF).

The core ontology hierarchy 2302 comprises document structure instance classes related as root classes and child classes. For example, FIG. 23 shows that the core ontology hierarchy 2302 starts with a root requirement class 2304 and that the root requirement class 2304 has four child classes: a RequirementType class 2306, a Requirement class 2308, an Agent class 2310, and an Action class 2312. The RequirementType class 2306 also has two child classes: a Functional class 2314 and a Nonfunctional class 2316. The Nonfunctional class 2316 is also a root class for two child classes: a Time class 2318 and a Security class 2320. The Security class 2320 also has two child classes: an Authentication class 2322 and an Encryption class 2324.

The Requirement class 2308 also has child classes. In one implementation, the Requirement class has a SimpleRequirement class 2326 and a ConditionalRequirement class 2328. The SimpleRequirement class 2326 has two child classes: a BusinessRule class 2330 and a Standard Requirement class 2332.

Like the Requirement class 2308, the Agent class 2310 has a User class 2334 and a System class 2336 as child classes. The Action class 2312 may or may not have child classes.

The subclasses for a parent class may be different depending on the context of the ontology hierarchy. For example, examples of other Nonfunctional classes include a SecureTokens class, a MessagingProtocol class, or other classes. The other parent classes may also have alternative subclasses depending on the context of the ontology hierarchy as well. Table 4 below lists some of the classes illustrated by the core ontology hierarchy 2302. In other implementations, the core ontology hierarchy 2302 includes alternative classes.

TABLE 4

| Class | Description |
|---|---|
| Root | The root of the ontology model |
| RequirementType | A class that defines the type of requirement |
| Requirement | A class that defines a requirement |
| Agent | A class that defines agents |
| Action | A class that defines actions |
| Functional | A class that defines functional requirements |
| Nonfunctional | A class the defines non-functional requirements |
| Time | A class that defines time |
| Security | A class that defines security |
| Authentication | A class that defines authentication |
| Encryption | A class that defines encryption |
| SimpleRequirement | A class that defines all requirements that are not conditional |
| ConditionalRequirement | A class that defines conditional requirements |
| BusinessRule | A class that defines those requirements that are business rules |
| StandardRequirement | A class that defines the standard requirement having the form: [agent] [modal] [word] [action] [rest] |
| User | A class that defines a user |
| System | A class that defines a system |

FIG. 23 also shows that the core ontology hierarchy 2302 defines class relationships between the root classes and their associated child classes. For example, FIG. 23 shows that the ontology model 2302 includes a horizontal class definition relationship 2338 and a vertical class definition relationship 2340. In general, horizontal class definition relationships define relationships between classes unrelated to hierarchy, and vertical class definition relationships define hierarchical relationships between classes. In the example shown in FIG. 23, the horizontal class definition relationship is a "hasRequirementType" relationship, and shows that the requirement class 2308 has a requirement type of the RequirementType class 2306. In addition, FIG. 23 shows that the vertical class definition relationship 2340 is a "has subclass" relationship that shows that the time root requirement class 2304 has four child classes. These relationships are not exhaustive and other relationships are also possible. Examples of class definition relationships are shown below in Table 5.

TABLE 5

| Relationship | Description |
|---|---|
| Affect | Classifications that affect each other. |
| Contradict | Classifications that contradict each other |
| Dependency | Classifications that depend on each other |
| Implement | Classification that implements a higher-level classification |
| Similarity | Classifications that are similar to each other |
| isA | Classifications that are special cases of other classifications |
| has subclass | Classifications where a subclass is a specialization of the parent class. For example, a "parent" is a sub-class of "human", which means that "parent" is a special sub-group of all "humans" that are parents |
| hasRequirementType | Classifications that define the type of the requirement. In general, the class may be a Functional class or a Nonfunctional class. |
| hasAgent | Classifications where the class is the agent of the requirement. |
| has instance | Classifications that instances of a class. In other words, the instance classification is the specific form of the general class that the instance class is instantiating. |
| hasAction | Classifications where the class is the action of the requirement. |
| Affects | Classifications that affect each other. |
| hasSecondaryAgent | Secondary agent of a requirement |
| hasEncryptionAlgorithm | EncryptionAlgorithm used by the System (e.g. SSH, RSA) |

The core ontology hierarchy 2302 may include, or be integrated with, one or more domain specific ontologies. The domain-specific ontology may include one or more domain-specific classes. For example, the core ontology hierarchy 2302 includes a domain-specific ontology 2342 that comprises a Time class 2318, a Security class 2320, an Authentication class 2322, and an Encryption class 2324. The domain-specific ontology 2342 is associated with the Nonfunctional class 2316 of the core ontology hierarchy 2302. Other examples of domain-specific ontologies include a mobile domain-specific ontology that has classes associated with mobile devices and an SAP system domain-specific ontology associated with SAP systems. Other domain-specific ontologies may be configured for other systems as well.

The domain-specific ontologies may be associated with other classes. For example, the core ontology hierarchy may have a domain-specific ontology associated with the Functional class 2314, a domain-specific ontology associated with the Requirement class 2308, a domain-specific ontology associated with the Agent class 2310, and a domain-specific ontology associated with the Action class 2312. In other words, a domain-specific ontology may be associated with any class of the core ontology hierarchy 2302.

Figure 24:
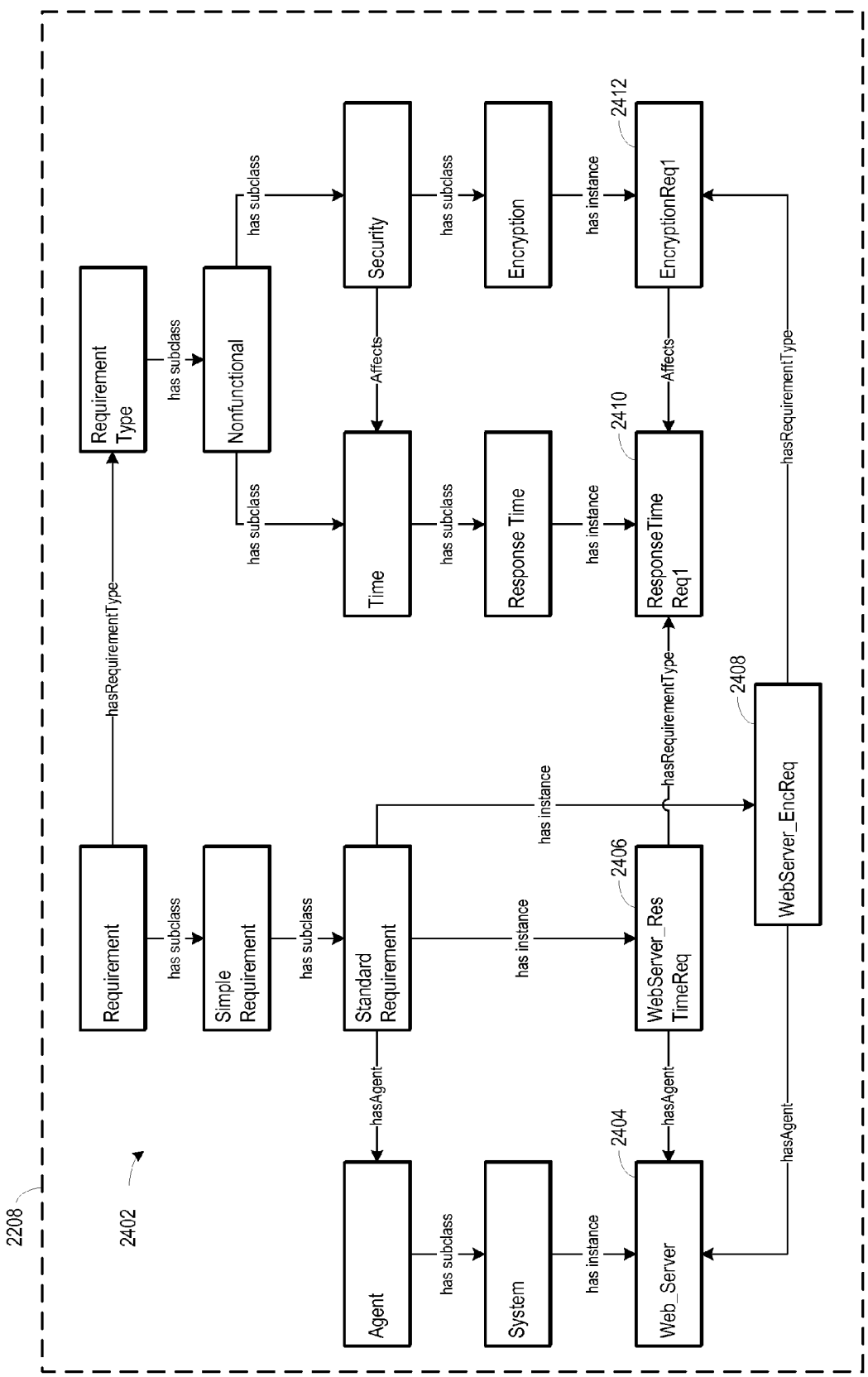
FIG. 24 shows an example of a document specific ontology hierarchy.

As discussed above, the graphing module 2204 is operative to generate a document specific ontology hierarchy using the document under analysis 112 and the core ontology hierarchy 2302. FIG. 24 illustrates an example of a document specific ontology hierarchy 2402. In the example shown in FIG. 24, the document specific ontology hierarchy 2402 generates the document specific ontology hierarchy 2402 using the following two document structure instances: 1) The Web Server shall encrypt all of its responses using SSH, and 2) The Web Server shall have a response time of 5 milliseconds or less.

The document specific ontology hierarchy 2402 includes hierarchy instance identifiers 2404-2412 that identify and establish relationships between the structure category components of these two document structure instances. For example, the document specific ontology hierarchy 2402 includes an agent hierarchy instance identifier 2404 that identifies the agent "Web Server," a standard requirement hierarchy instance identifier 2406 that identifies the response time of 5 milliseconds, a standard requirement hierarchy instance identifier 2408 that identifies the document requirement that the Web Server agent has an encryption requirement of SSH, response time hierarchy instance identifier 2410 that identifies an instance of the response time parent class, and an encryption hierarchy instance identifier 2412 that identifies an instance of the encryption parent class.

The document specific ontology hierarchy 2402 provides a powerful and informative graphical overview of the relationships between the classes of the core requirement ontology 2302 and the document structure instances 134-136. Given the large size of requirements documents, the graphing module 2204 may provide information about the various systems being referred to in the requirements document.

The requirements graphing system 2202 may interact with any other systems, such as requirements analysis system 702, the requirements commenting system 1002, the ontology analysis system 1900, or any other system, to provide information relating to the document structure instances. For example, the document specific ontology hierarchy 2402 may be queried to provide information about the document structure instances using one or more query languages, such as a SPARQL. In one implementation, the following SPARQL query may be passed to the document specific ontology hierarchy 2402 to determine if there are any relationships between the document structure instances:

```
select ?req1, ?req2 where
{ ?req1 hasRequirementType ?type1
  ?req2 hasRequirementType ?type2 .
  Affects domain ?type1 .Affects range ?type2 .
  ?req2 hasAgent ?agent2 .?req1 hasAgent ?agent1
  filter( ?agent1 = ?agent2)}
```

Although the query to the document specific ontology hierarchy 2402 may be in any language, the above SPARQL query returns all requirements for the same agent that have requirement types that affect each other.

The requirements graphing system 2202, or any of the other systems, may also support additional queries. For example, the requirements graphing system 2202 may support a system-interaction query that identifies systems that interact with each other. The system-interaction query may be configured to return or display all requirements that have a system agent as a primary agent and a system agent as the secondary agent.

Consider the following document structure instance: The Web Server shall send the vendor data to the SAP System. In this document structure instance, the Web Server is the primary agent and the SAP System is the secondary agent. Both of these systems may be classified in the agent glossary 140 so that the requirements graphing system 2202 may determine that these systems are interacting with each other. One example of a system-interaction query is below:

```
select ?req1 ?agent1 ?agent2
where {
    ?req1 hasAgent ?agent2 .
    ?req1 hasSecondaryAgent ?agent2.
    ?agent1 RDF:type System.
    ?agent2 RDF:type System.
    filter( ?agent1 != ?agent2)
}
```

The requirements graphing system 2202 may also support identifying systems that are missing non-functional requirements. In general, there is often the case that a system may require a particular requirement to be identified. The required requirement for the system may not be identified in the requirements document. The requirements graphing system 2202 may accept a non-functional requirement identification query that returns all systems which are missing a certain kind of non-functional requirement. Examples of non-functional requirements include: security, performance, reliability, usability, integration and data requirements. Each of these non-functional requirements may also include additional or sub-requirements that are non-functional requirements. Other non-functional requirements are also possible. One example of this query is below:

```
Function DetectMissingRequirements
Start
    For each agent in AgentGlossary
        For each NonFunctionalRequirementType in
        RequirementsOntology
            ExecuteQuery (agent, nonFunctionalRequirementType)
        End For
    End For
End
Function ExecuteQuery (agent, nonFunctionalRequirementType)
Start
    AskQueryString =
        "Ask {" +
            "req hasAgent agent ;" +
            "req hasRequirementType
            nonFunctionalRequirementType"+
        "}"
    Result = Model.executeQuery (AskQueryString)
    If result = false
        Print "Agent" + agent + "is missing non-functional
        requirement type" + nonFunctionalRequirementType
End
```

The requirements graphing system 2202 may also support identifying interacting systems that do not have compatible security profiles. In one implementation, the requirements graphing system 2202 supports a security profile identification query that determines whether interacting systems have similar protocol requirements. For example, consider the case where one system has a requirement for supporting a certain kind of encryption, while an interacting system does not have any requirement for the same kind of encryption. In this example, the requirements graphing system 2202 identifies out that there is the potential for a security-based incompatibility. One example of a security profile identification query is below:

```
select ?agent1 ?agent2
where {
    ?req hasAgent ?agent2 .
    ?req hasSecondaryAgent ?agent2.
    ?agent1 RDF:type System.
    ?agent2 RDF:type System.
    ?agent1 hasRequirementType ?EncryptionReq1.
```

-continued

```
    ?agent2 hasRequirementType ?EncryptionReq2.
    ?EncryptionReq1 RDF:type Encryption.
    ?EncryptionReq2 RDF:type Encryption.
    ?EncryptionReq1 hasEncryptionTechnique? ?technique1.
    ?EncryptionReq2 hasEncryptionTechnique? ?technique2.
    filter( ?agent1 != ?agent2 and ?technique1 != ?technique2)
}
```

In the query implemented above, the query identifies two interacting system (denoted by "?agent1" and "?agent2" in the SPAQL query) that do not use the same encryption technique. For example, if the first system, that is system 1, (i.e., "?agent1") interacts with the second system, that is system 2, (i.e., "?agent2"), and the first system uses the RSA encryption technique and the second system uses the SSH protocol, then the above query returns "system 1" and "system 2". The above query is one example for identifying security profiles, but other queries are also possible for identifying other security attributes such as authentication, access control, or other attributes.

Note that in addition to these queries, the requirements graphing system 2202, or any other system, may be extended by adding other system-based analyses using additional queries.

In addition to the system-based analyses, the requirements graphing system 2202 may support analyses based on the role of an agent. For example, the requirements graphing system 2202 may be configured to accept queries for a particular domain. In one implementation, the requirements graphing system 2202 is operative to capture information in the domain ontologies about which agents are permitted to perform which actions. This may be used to ensure that all the requirements meet that constraint. Another variation of a similar analysis is "Separation of duty", as outlined in Sarbanes Oxley. The requirements document, or any other document under analysis, may be checked to see if the same agent may perform different roles (e.g. the purchasing manager may be the approving manager).

Exemplary aspects, features, and components of the system were described above. However, the system may be implemented in many different ways. For example, some features are shown stored in computer-readable memories and may be implemented with logic stored as processor-executable instructions or as data structures in a hardware memory. Examples of hardware memories include random access memory (RAM), read-only memory (ROM), erasable and rewriteable memory, removable discs, and fixed discs. Furthermore, all or part of the system and its logic and data structures may be stored on, distributed across, or read from other machine-readable media. The media may include hard disks, floppy disks, CD-ROMs, tangible signals, such as a signal received from a network, received over multiple packets communicated across the network, or received at an antenna or other receiver.

The system may be implemented with addition, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that implements functionality for a specific module as noted above. As another example, the DLL may itself provide all or some of the functionality of the system. In one implementation, the system is implemented using Visual Basic for Applications as a Word™ application plug-in.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method comprising:
    identifying a document structure instance that includes a plurality of structure components;
    selecting one structure component from the structure components;
    selecting by a processor, a pre-configured core ontology hierarchy associated with the selected structure component, the pre-configured core ontology hierarchy including a plurality of classes, and a class definition relationships;
    generating a document specific ontology hierarchy based on the selected pre-configured core ontology, wherein the document specific ontology includes a subset of the classes included in the pre-configured core ontology hierarchy;
    inserting into the document specific ontology instance identifiers associated with each respective structure component; and
    outputting the document specific ontology hierarchy.

2. The method of claim 1, where the class definition relationship illustrates a relationship between at least two of the classes.

3. The method of claim 1, where identifying comprises identifying the document structure instance using a document structure identifier.

4. The method of claim 3, where the document structure identifier identifies a document type including structure categories; and
    where the selected structure component is associated with at least one of the structure categories of the document type.

5. The method of claim 1, where the classes include a root class and a child class of the root class.

6. The method of claim 5, where the class definition relationship identifies a vertical relationship between the root class and the child class.

7. The method of claim 1, further comprising:
    determining a glossary associated with the selected structure component, the glossary including permissible terms for a structure category associated with the selected structure component, the permissible terms including hierarchy parameters indicating parent or child relationships for the permissible terms.

8. The method of claim 7, where generating comprises generating the hierarchical graph using the hierarchy parameters of the permissible terms in the glossary.

9. The method of claim 1, where the class definition relationship comprises an affect relationship, a contradict relationship, a dependency relationship, an implement relationship, a similarity relationship, or any combination.

10. A system comprising:
a memory comprising:
    a document structure instance that includes structure components;
    instructions to:
        receive a selected structure component from the structure components;
        select a pre-configured core ontology hierarchy associated with the selected structure component, the pre-configured core ontology hierarchy including a plurality of classes, and a class definition relationships
        generate a document specific ontology hierarchy based on the selected pre-configured core ontology, wherein the document specific ontology includes a subset of the classes included in the pre-configured core ontology hierarchy;
        insert into the document specific ontology instance identifier that identifies the selected structure component; and
        output the hierarchical graph; and
a processor configured to execute the instructions.

11. The system of claim 10, where the class definition relationship identifies a relationship between at least two of the classes.

12. The system of claim 10, where the class definition relationship comprises an affect relationship, a contradict relationship, a dependency relationship, an implement relationship, a similarity relationship, or any combination.

13. The system of claim 10, where the classes include a root class and a child class of the root class; and
where the class definition relationship identifies a vertical relationship between the root class and the child class.

14. The system of claim 10, further comprising:
a glossary associated with the selected structure component, the glossary including permissible terms for a structure category associated with the selected structure component, the permissible terms including hierarchy parameters indicating parent or child relationships for the permissible terms; and
where the hierarchical graph is generated according to the hierarchy parameters of the permissible terms in the glossary.

15. The system of claim 10, where the selected structure component is a first selected structure component and where the hierarchical graph that is generated is a first hierarchical graph, and where the memory further comprises:
instructions to:
    receive a second selected structure component from the structure components; and
    generate a second hierarchical graph of said document structure instance corresponding to the second selected structure component.

16. The system of claim 10, where the memory further comprises: instructions to:
modify the hierarchical graph to include instance identifiers of each respective structure component in the hierarchical graph.

17. The system of claim 10, where the memory further comprises:
instructions to
    compare the hierarchical graph with a predetermined hierarchical graph to detect compatibility of the document structure instance with a predetermined format of a document comprising the document structure instance.

18. A method comprising:
accessing a pre-configured core ontology hierarchy that defines a hierarchy of classes and class definition relationships between at least some of the classes, where each of the classes of the ontology model is associated with a search term;
analyzing a first document structure instance against the ontology model to determine a first class associated with the first document structure instance by searching the first document structure instance for a first search term associated with the first class;
analyzing a second document structure instance against the ontology model to determine a second class associated with the second document structure instance by searching the second document structure instance for a second search term associated with the second class; and
analyzing, with a processor, the class definition relationships to determine whether the first class affects the second class
generating a document specific ontology hierarchy based on the selected pre-configured core ontology, wherein the document specific ontology includes a subset of the classes included in the pre-configured core ontology hierarchy and a first instance identifier that identifies the first class associated with the first document structure instance and a second instance identifier that identifies the second class associated with the second document structure instance; and
outputting the ontology model.

19. The method of claim 18, where the classes include a root class and a child class.

* * * * *